United States Patent
Tanaka et al.

[11] Patent Number: 5,953,463
[45] Date of Patent: Sep. 14, 1999

[54] IMAGE PROCESSING METHOD AND IMAGE PROCESSING APPARATUS

[75] Inventors: Tomoki Tanaka, Yamatokoriyama; Yoshiyuki Nakai, Nara, both of Japan

[73] Assignee: Sharp Kabushiki Kaisha, Osaka 545, Japan

[21] Appl. No.: 08/784,375

[22] Filed: Jan. 17, 1997

[30] Foreign Application Priority Data

Jan. 17, 1996 [JP] Japan .................................. 8-005983

[51] Int. Cl.⁶ .................................................. G06K 9/32
[52] U.S. Cl. .......................................... 382/298; 358/451
[58] Field of Search .................................. 382/272, 274, 382/298, 299, 300; 358/448, 458, 462, 466

[56] References Cited

U.S. PATENT DOCUMENTS

| | | | |
|---|---|---|---|
| 4,194,221 | 3/1980 | Stoffel | 358/283 |
| 4,547,811 | 10/1985 | Ochi et al. | 382/283 |
| 4,734,782 | 3/1988 | Maeshima | 358/466 |
| 4,991,092 | 2/1991 | Greensite | 382/274 |
| 5,054,100 | 10/1991 | Tai | 382/300 |
| 5,132,788 | 7/1992 | Hirota | 358/517 |
| 5,134,503 | 7/1992 | Kimura | 358/448 |
| 5,153,925 | 10/1992 | Tanioka et al. | 358/462 |
| 5,278,919 | 1/1994 | Sugiura et al. | 382/270 |
| 5,280,546 | 1/1994 | Machida et al. | 382/274 |
| 5,339,365 | 8/1994 | Kawai et al. | 358/448 |
| 5,493,411 | 2/1996 | Haneda et al. | 358/462 |
| 5,548,415 | 8/1996 | Tanake et al. | 358/462 |
| 5,832,141 | 11/1998 | Ishida et al. | 382/298 |

FOREIGN PATENT DOCUMENTS

| | | | |
|---|---|---|---|
| 0389164 | 9/1990 | European Pat. Off. | G06F 15/66 |
| 0407213 | 1/1991 | European Pat. Off. | H04N 1/40 |
| 0645736 | 3/1995 | European Pat. Off. | G06T 3/40 |
| 61-194968 | 8/1986 | Japan | H04N 1/00 |
| 62-147860 | 7/1987 | Japan | H04N 1/40 |
| 63-246076 | 10/1988 | Japan | H04N 1/40 |
| 1211085 | 8/1989 | Japan | G06F 15/66 |
| 4365182 | 12/1992 | Japan | G06F 15/66 |
| 521384 | 3/1993 | Japan | H04N 1/40 |
| 05135165 | 6/1993 | Japan | H04N 1/40 |
| 6286221 | 10/1994 | Japan | H04N 1/393 |
| 07066976 | 3/1995 | Japan | H04N 1/40 |
| 9016034 | 12/1990 | WIPO | G06F 15/353 |

*Primary Examiner*—Jon Chang
*Assistant Examiner*—Jingge Wu
*Attorney, Agent, or Firm*—Dike, Bronstein, Roberts & Cushman, LLP; David G. Conlin; Richard E. Gamache

[57] ABSTRACT

In an image processing method, an image is read by an image processing apparatus such as a digital copying machine and the read image is divided into blocks composed of a plurality of picture elements. Thereafter, interpolation is performed on a target picture element so that the image is scaled. Then, in the above image processing method, region segmentation data, which represent possibilities of characters, photographs and mesh dots of the target picture element of the image, are detected in a region segmentation section of the image processing apparatus, and the interpolated picture element data of the target picture element are computed by a variable scaling section according to an equation in which density of a plurality of adjacent picture elements in the vicinity of the target picture element are inputted. At this time, a weights of the density of each adjacent picture element in the equation is adjusted based upon the result detected by the region segmentation means. As a result, even if characters, photographs and mesh dots coexist in an image read by a scanner, the image is scaled according to the characters, photographs and mesh dots, thereby preventing deterioration in image quality.

14 Claims, 22 Drawing Sheets

INPUT IMAGE DATA : 128(/256)
SPECIAL DATA : TO LEFT
ON 128/256=1/2DOT
OFF 128/256=1/2DOT

INPUT IMAGE DATA : 128(/256)
SPECIAL DATA : TO RIGHT
OFF 128/256=1/2DOT
ON 128/256=1/2DOT

INPUT IMAGE DATA : 128(/256)
SPECIAL DATA : TO CENTER
OFF 1/4DOT
ON 128/256=1/2DOT
OFF 1/4DOT

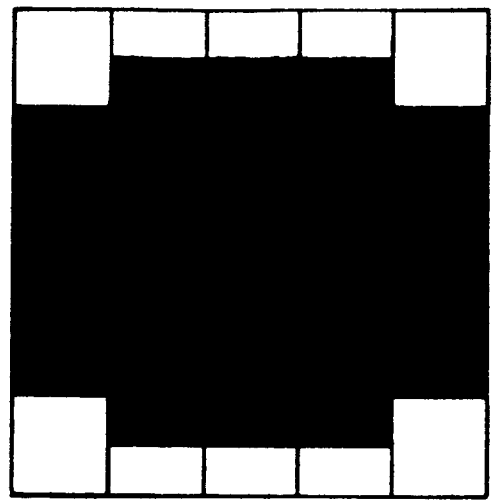
FIG.19(c)
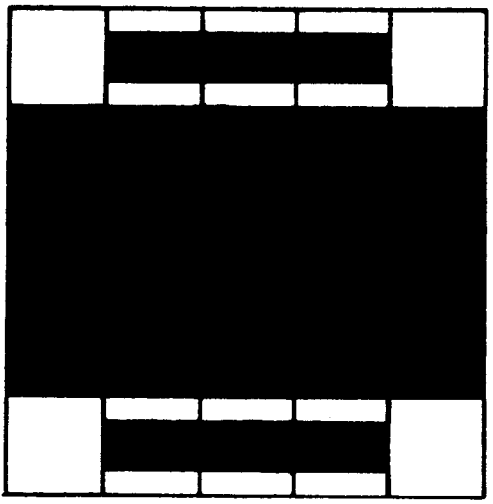
FIG.19(b)
FIG.19(a)
| 00H | FFH | FFH | FFH | 00H |
| 80H | FFH | FFH | FFH | 80H |
| 80H | FFH | FFH | FFH | 80H |
| 80H | FFH | FFH | FFH | 80H |
| 00H | FFH | FFH | FFH | 00H |
8

INPUT IMAGE DATA

INPUT REGION SEPARATING DATA

OUTPUT SPECIAL DATA

OUTPUT IMAGE DATA

OUTPUT REGION SEPARATING DATA

IMAGE PROCESSING METHOD AND
IMAGE PROCESSING APPARATUS

FIELD OF THE INVENTION

The present invention relates to an image processing method and an image processing apparatus which are used for an image input/output device such as a digital copying machine and reads an image and divides the read image into blocks composed of a plurality of picture elements so as to perform a variable scaling process on the image by interpolating or thinning out each picture element.

BACKGROUND OF THE INVENTION

Conventionally, in the case where a variable scaling of an input image is performed by a digital copying machine, namely, the input image is enlarged or reduced by a digital copying machine, it is enough to select either of a nearest neighbor interpolation and interpolations of first through third degrees per page.

In the nearest neighbor interpolation, an image is divided into blocks composed of a plurality of picture elements, and when enlarging the image, the data of the picture element existing in the nearest neighborhood of a target picture element is used as data of the target picture element. The enlarging method by means of the nearest neighbor interpolation has a preferable characteristic that an edge of a character becomes clear.

In addition, in the interpolation of first through third degrees, data of a target picture element in divided blocks are determined by using an computing mean of the data of the nearest neighbor picture element of the target picture element and data of another neighbor picture element, which is obtained by formulas of the first through third orders so that an image is enlarged. This method is also called as a linear interpolation. More specifically, the data of the nearest neighbor picture element of the target picture element and the data of another neighbor picture element are respectively weighted with an inverse number of a distance from the target picture element and a weighted mean is obtained. The data obtained from the weighted means is specified as data of the target picture element.

The enlarging method through the interpolations of first through third degrees is preferable as the enlarging process in the case of processing an image in which density gradually changes like a photographic image because new data of a picture element interpolated between the respective picture elements (interpolation picture element data) become means of picture element data existing on both sides adjacent.

However, in the case where two or more types of image data, such as characters, photographs and mesh dots, coexist on one page of image, if a variable magnification of such an image is processed by either of the nearest neighbor interpolation and the interpolations of first through third degrees, image quality of either of the characters, the photographs, etc. is deteriorated.

Therefore, Japanese Unexamined Patent Publication No. 6-286221/1994 (Tokukaihei 6-286221) discloses a printing method which is capable of changing a variable scaling process according to types of data in the case where characters, photographs, mesh dots, etc. coexist on one page.

In this printing method, input data such as character information such as character codes and form information are inputted from a host as an external device into a buffer memory of a printer. The printer creates a character pattern and a form pattern according to the information of the inputted data so as to print an image.

In the case where enlarging or reducing process is executed prior to printing, when a special enlarging or reducing method is cataloged into the printer according to the character pattern, etc., variable scaling is performed by the enlarging or reducing process. Therefore, the variable scaling process can be performed according to each type of data.

However, since the above conventional image processing method is applied to a printer, and the variable scaling process of such a printer can be previously judged by information from an external host that characters, vector drawings and bit images is inputted as image data. Therefore, in image input and output devices such as a copying machine, the above-mentioned image processing method has a disadvantage that in the case where document image is read by a scanner and characters, photographs and mesh dots coexist on one page of the read document image, a variable scaling process cannot be performed according to the type of image data.

SUMMARY OF THE INVENTION

The present invention is invented from a viewpoint of the above conventional problem, and it is an object of the present invention to provide an image processing method and an image processing apparatus which are capable of, even if characters, photographs and mesh dots coexist in an image read by a scanner, preventing a deterioration in image quality by variable scaling the image according to the characters, photographs and mesh dots.

In order to achieve the above object, an image processing method of the present invention for scaling an image is characterized by having: the step of dividing an image into blocks composed of a plurality of picture elements so as to detect region segmentation data, which represent possibilities of characters, photographs and mesh dots in a block of a target picture element, by region segmentation means per target picture element; and the step of computing density of the target picture element on the output image by using computing means according to an equation into which density of a plurality of adjacent picture elements in the vicinity of the target picture element is inputted, wherein in the computing step, a weight of the density of each adjacent picture element in the equation is adjusted according to the region segmentation data of the target picture element.

In other words, in the case where characters and photographs, etc. coexist in a document image, when the conventional nearest neighbor interpolation or the interpolation of first through third degrees is used for enlarging magnification, the following problems arise. Namely, when the nearest neighbor interpolation is selected, a pseudo-contour occurs on a photograph, and when the interpolation of first through third degrees is selected, an edge of characters becomes unclear.

However, in accordance with the above method, region segmentation data, which represent possibilities of characters, photographs and mesh dots of a target picture element on an image are detected by the region segmentation means, and interpolated picture element data per picture element are computed by the computing means according to the equation in which density of a plurality of adjacent picture elements in the vicinity of the target picture element is inputted. At this time, a weight of the density of each adjacent picture element in the equation is adjusted based upon the result detected by the region segmentation means.

Therefore, a portion where the possibility of characters is strong is enlarged by the nearest neighbor interpolation or the like so that the edge of the enlarged characters can be prevented from becoming unclear. Meanwhile, a portion where the possibility of photographs is strong is enlarged by the interpolation of first through third degrees or the like so that the pseudo-contour can be prevented from occurring on the enlarged photograph.

As a result, even if characters, photographs and the mesh dots coexist on an image read by a scanner, the image is scaled according to the characters, photographs or mesh dots so that deterioration of image quality can be prevented.

It is desirable that the image processing method is such a method that in the detecting step, the region segmentation data are set so as to take a value X which falls the range of 0 to N−1 (N is an integral number not less than 2) and so that as the possibility of characters is stronger, the region segmentation data takes a smaller value and as the possibilities of photographs and mesh dots are stronger, the region segmentation data takes a larger value, and in the computing step, density $D_p$ of a picture element P which is a target picture element whose density should be determined, is computed according to the following equation:

$$D_p = (1-K) \times D_a + K \times D_b \quad (1)$$

(However, $K=(X_p/(N-1)) \times (PA/(PA+PB))$)

where $X_p$ is region segmentation data of the picture element P, $D_a$ is density of a picture element A which is the closest to the picture element P, $D_b$ is density of a picture element B which is the second closest to the picture element P, PA is a distance between the picture element P and the picture element A, and PB is a distance between the picture element P and the picture element B.

In other words, characters, photographs and mesh dots mostly coexist on an actual image, and when pattern matching or the like is used as a variable scaling method for a target picture element of such an image, a lot of memories are required for performing the variable scaling process delicately, and time required for the process is increased.

However, in accordance with the above method, the computing means computes the density $D_p$ of the picture element P according to the equation (1). In the equation (1), in the case where the region segmentation data $X_p$ obtain a value 0 representing complete characters, for example, K=0 and $D_p=D_a$. Namely, this means the variable scaling process by the nearest neighbor interpolation.

Meanwhile, in the case where the region segmentation data $X_p$ obtains a value N−1 representing complete photograph, for example, $$D_p = (PB \cdot D_a + PA \cdot D_b)/(PA+PB)$$

Therefore, $D_p$ becomes a linearly weighted mean of the density $D_a$ of the picture element A which is the closest to the picture element P and the density $D_b$ of the picture element B which is the second closest to the picture element P.

Therefore, even if characters, photographs and mesh dots coexist on an image, when the nearest neighbor interpolation or the like is used for a portion where the possibility of characters is strong and a method which is closer to the interpolation of first degree is used for a portion where the possibility of photographs is strong at the time of performing the variable scaling process, a more suitable density of scaling-processed data can be obtained according by a simple summing and multiplying operation of the equation (1) based upon the region segmentation data which represent the possibilities of characters, photographs and mesh dots detected by the region segmentation means. Namely, since density can be selected by outstanding software suitably for the characters, photographs and mesh dots per target picture element, density can be determined quickly and the deterioration of image quality can be prevented by a simple arrangement of hardware.

In addition, it is desirable that the image processing method further has: the step of obtaining picture element density slope data which represent density slope of the picture element P with respect to picture elements which are adjacent to the picture element P after the computing step; and the step of on the picture element P whose region segmentation data $X_p$ is 0 and whose density $D_p$ is half-tone density, and on the picture element A which is the closest to the picture element P, when the picture element density slope data are data representing a relationship $D_a < D_p < D_b$, converting the density $D_p$ into a value obtained by multiplying the half-tone density and magnification of the variable scaling together, and setting the density $D_a$ to 0, whereas when the picture element density slope data are data representing a relationship $D_b < D_p < D_a$, converting the density $D_a$ into a value obtained by multiplying the half-tone density and magnification together, and setting the density $D_p$ to 0.

In the case where the read image is character data and picture elements in the read position is an edge of the character, the density of this picture element is mostly half-tone density. Then, when the image is subject to the variable scaling process by the summing and multiplying operation in the equation (1), the half-tone density continues, and thus the edge becomes unclear.

However, in accordance with the above method, when the density $D_a$ of the picture element A which is the closest to the picture element P is half-tone density (i.e., larger than 0 and smaller than the maximum density) and the picture element density slope data $S_p$ of the picture element P are data representing a relationship $D_a < D_p < D_b$ (positive), the density $D_p$ is converted into a value obtained by multiplying the half-tone density and magnification together and the density $D_a$ is set to 0, whereas when the density $D_a$ is half-tone density and the picture element density slope data $S_p$ of the picture element P are data representing a relationship $D_b < D_p < D_a$ (negative), the density $D_a$ is converted into a value obtained by multiplying the half-tone density and magnification together, and the density $D_p$ is set to 0.

Therefore, the density of two picture elements in the edge portion of the character data (pulse width for outputting a laser) is subject to the variable scaling process so that the density of the picture element inside a character is varied according to magnification and the density of the picture element outside the character becomes 0. As a result, the edge portion of the character data is further enhanced, and thus the edge portion of the characters can be prevented from becoming unclear.

It is desirable that the image processing method further has: the step of outputting a laser according to density data with respect to the target picture element after the converting step, wherein in the laser outputting step, a laser is outputted to the target picture element, to which the value obtained by multiplying the half-tone density and the magnification of the various scaling together is given, in a position which is shifted to a side of the picture element where the density is higher based upon the picture element density slope data of the target picture element.

In other words, in the case where the read image is character data and the picture element in the read position is an edge of the image, when the picture element, which was subject to the process of, for example, 8 bits/picture element, has half-tone density, the picture element has the density of 128, i.e., 80H (H represents hexadecimal notation). Therefore, in an image output device which outputs a half-tone image by varying a pulse width of one picture element, the image data of 80H are generated in the central position of the picture element for half dot of one picture element. Then, in the case where the picture element, on which the image data for half dot are generated in its central position, is subject to the enlarging process, a white picture element of half dot appears between the picture element and an adjacent picture element. Such a white picture element continues per picture element, and thus a so-called ghost contour occurs.

However, in accordance with the above method, a laser is outputted for a target picture element, to which the value obtained by multiplying the half-tone density and the magnification together is given, in a position which is shifted to a side of the picture element where the density is higher based upon the picture element density slope data of the target picture element.

Therefore, when the picture element for the edge portion of the character data is subject to the variable magnification process according to magnification via the image processing method, the ghost contour is prevented from occurring on the left or right of one picture element at the edge of the character data.

It is desirable that the image processing method is a such a method that in the computing step, when the data of each interpolated picture element is computed by the computing means, the region segmentation data detected by the region segmentation means is variably scaled so as to be outputted together with the scaling-processed image data.

In other words, in the case where the image data which was subject to variable scaling process are desired to be outputted into an external asynchronous image input/output device, such as a facsimile and a personal computer, together with the region segmentation data, for example, if also the region segmentation data is not subject to the variable scaling process, a number of picture elements of the scaling-processed image data does not agree with that of the region segmentation data. For this reason, the region segmentation data cannot be used.

However, in accordance with the above method, the region segmentation data detected by the region segmentation means are also subject to the variable scaling process based upon the result detected by the region segmentation means so as to be outputted together with the scaling-processed image data.

Therefore, a number of picture elements of the magnification varied image data can agree with that of the region segmentation data. As a result, in the case also where these data are outputted to an external asynchronous image input/output device such as a facsimile and a personal computer, the region segmentation data can be used.

It is desirable that the variable scaling process for the region segmentation data in the computing step is performed based upon the result detected by the region segmentation means.

As a result, since the data representing the possibilities of characters, photographs and mesh dots are given also to the scaling-processed region segmentation data, the scaling-processed image can be outputted to an external image input/output device such as a facsimile and a personal computer by combining these data with the region segmentation data.

It is desirable that the image processing method further has: the step of simultaneously outputting the scaling-processed image data and the scaling-processed region segmentation data after the computing step, wherein in the outputting step, directing data, which represent a front and a rear of each line of plural picture elements on the output data and end of the image data, together with the scaling-processed image data and the scaling-processed region segmentation data.

In other words, in the case where the scaling-processed image data are outputted to an external asynchronous image input/output device such as a facsimile and a personal computer, when the data, which represent the front and rear of the line and the end of the image data, do not exist in the magnification varied region segmentation data, a number of picture elements of one line and a total number of lines should be transmitted to other external asynchronous image input/output device. Moreover, even in the case where this transmission is executed, a line counter should be always provided.

However, in accordance with the above method, since the directing data, which represent the front and the rear of each line of a plurality of picture element on the output data and the end of the image data, are simultaneously outputted, a number of picture elements for one line and a total number of lines does not have to be transmitted to an external synchronous image input/output device. Furthermore, installation of a line counter can be avoided.

An image processing apparatus of the present invention for scaling inputted image so as to output the scaling-processed image is characterized by having: region segmentation means for dividing the input image into blocks composed of a plurality of picture elements and detecting region segmentation data, which represent possibilities of characters, photographs and mesh dots of a block of a target picture element per target picture element; and computing means for computing density of the target picture element on the output image by using an equation in which density of a plurality of adjacent picture elements in the vicinity of the target picture element is inputted, wherein the computing means adjusts a weight of the density of each adjacent picture element in the equation according to the region segmentation data of the target picture element.

In accordance with the above arrangement, the region segmentation data, which represent the possibilities of characters, photographs and mesh dots on the image, are detected by the region segmentation means, and the interpolated picture element data per picture element are computed by the computing means according to the equation in which the density of a plurality of adjacent picture elements in the vicinity of the target picture element is inputted. At this time, a weight of the density of each adjacent picture element in the equation can be adjusted based upon the result detected by the region segmentation means.

Therefore, the portion where the possibility of characters is strong is enlarged by the nearest neighbor interpolation or the like so that the edge of the enlarged characters can be prevented from becoming unclear. Meanwhile, the portion where the possibility of photograph is strong is enlarged by the interpolation of first through third degrees or the like so that a pseudo-contour is prevented from occurring on the enlarged photograph.

As a result, even in the case where characters, photographs and mesh dots coexist in an image read by a scanner, deterioration of image quality can be prevented by the variable scaling process according to the characters, photographs and mesh dots.

For fuller understanding of the nature and advantages of the invention, reference should be made to the ensuing detailed description taken in conjunction with the accompanying drawings.

BRIEF DESCRIPTION OF THE DRAWINGS

FIG. 5(a) is a drawing which shows an output of the pulse width modulator in the case where half-tone data are outputted shifted to the left; FIG. 5(b) is a drawing which shows an output of the pulse width modulator in the case where half-tone data are outputted shifted to the right; and FIG. 5(c) is a drawing which shows an output of the pulse width modulator in the case where half-tone data are outputted being centered.

FIGS. 19(a) through 19(c) are explanatory drawings which show effects of an ON signal position operation in the picture elements by means of the pulse width modulator: FIG. 19(a) is a drawing which shows density values (256 tones) of the picture elements; FIG. 19(b) is a drawing which shows an output when a picture element density slope data is fixed to the center; and FIG. 19(c) is a drawing which shows an output when the pulse width is outputted shifted to the side where the density is high based upon data representing the density slope.

FIG. 22 (b) is a drawing which shows the front of each line of each data outputted from the variable magnification processing section.

FIG. 23(a) is a drawing which shows the rear of each line of each data inputted to the variable scaling section; and FIG. 23(b) is a drawing which shows the rear of each line of each data outputted from the variable scaling section.

FIG. 24(a) is a drawing which shows an end portion of an image data of each data inputted into the variable scaling section; and FIG. 24(b) is a drawing which shows an end portion of image data of each data outputted from the variable magnification processing section.

DETAILED DESCRIPTION OF THE PREFERRED EMBODIMENTS

Embodiment 1

The following describes one embodiment of the present invention on reference to FIGS. 1 through 17.

Figure 1:
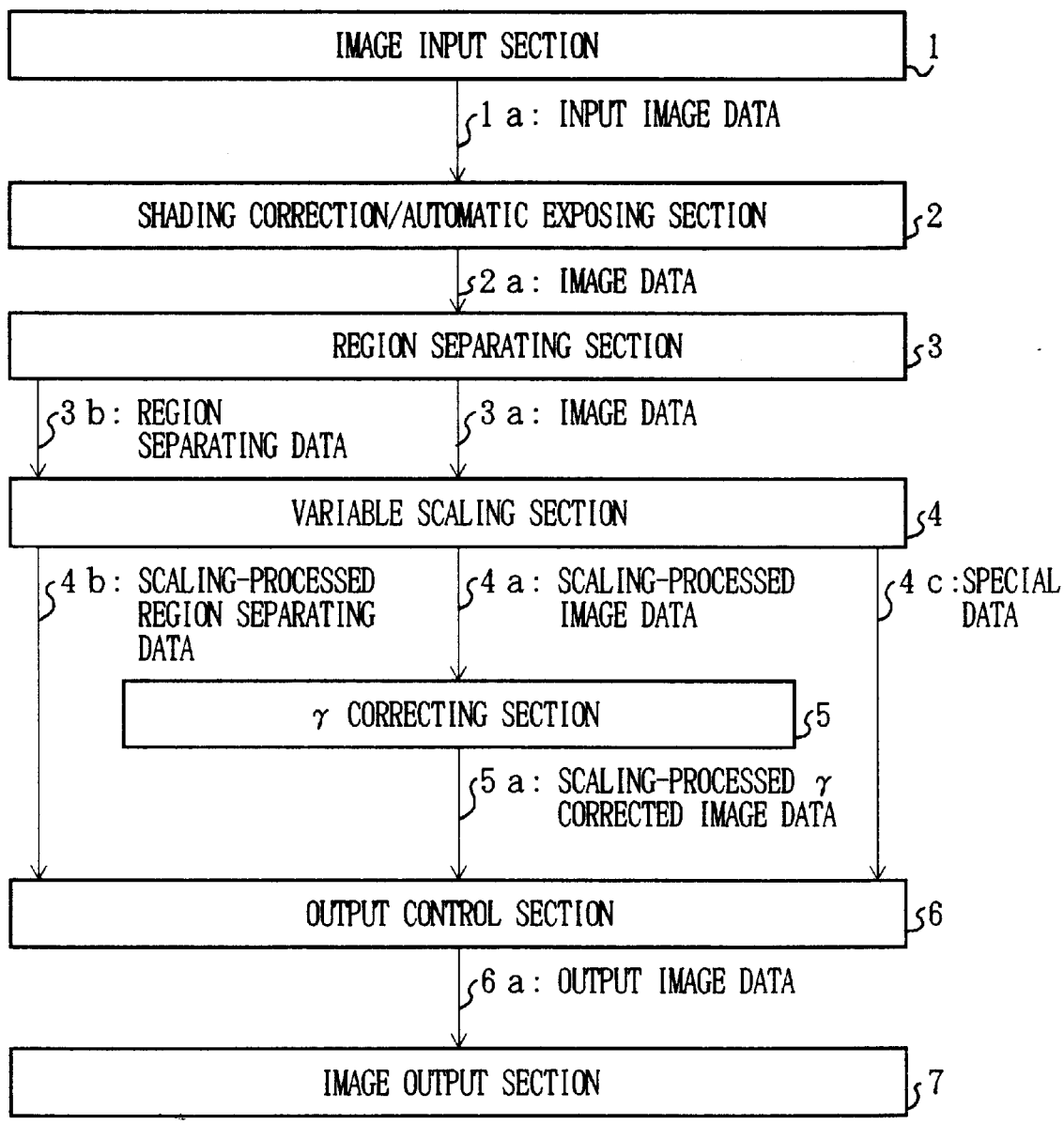
FIG. 1 is a block diagram which shows an arrangement of a digital copying machine as an image processing apparatus which adopts an image processing method according to one embodiment of the present invention.

As shown in FIG. 1, a digital copying machine as an image processing apparatus of the present embodiment is provided with an image input section 1, a shading correcting/automatic exposing section 2, a region segmentation section 3 as region segmentation means, a variable scaling section 4 as computing means, a γ correcting section 5, an output control section 6 and an image output section 7.

The image input section 1 reads a document image from a scanner, not shown, so as to convert the read image into digital input image data 1a. The shading correcting/automatic exposing section 2 processes shading correction and automatic exposure of the input image data 1a.

While referring to density, etc. of picture elements in the vicinity of target picture elements of the image data 2a which were subject to the shading correction and the automatic exposure, the region segmentation section 3 detects a possibility of characters, a possibility of photographs and a possibility of mesh dots of the target picture elements of the image data 2a so as to output image data 3a and region segmentation data 3b.

The region segmentation data 3b, which represents the possibilities of characters, photographs and mesh dots, take a value X which falls within the range of 0 to N−1 (N: an integral number not less than 2). The smaller the value X is, the stronger the possibility of characters is, and the larger the value X is, the stronger the possibilities of photographs and mesh dots are. In the present embodiment, N=8, for example, is adopted. Therefore, when the possibilities of photographs and mesh dots are the strongest, the region segmentation data 3b take the value X=7.

The following describes a technique of detecting the possibilities of characters, photographs and mesh dots in each picture element. The possibilities of characters, etc. can be detected by the prior art, but in the present embodiment, a few improvements are made on the prior art.

As the prior art, for example, there exists an art of dividing an image into blocks composed of a plurality of picture elements and identifying the image per block by using pattern matching or feature parameters which represent properties of a character image and a mesh dot image so as to detect the possibilities of characters, etc.

Since the image identification method using the pattern matching requires preparation of many patterns, there arises a problem that a memory capacity becomes enormous and that this method lacks versatility. For this reason, the image identification method using the feature parameters is adopted increasingly at present.

As the image identification method using the feature parameters, Japanese Unexamined Patent Publication No. 61-194968/1986 (Tokukaisho 61-194968) discloses a mesh dot photographic region identification method of individually measuring changes in signal levels of two picture elements which spatially continue in the two cases where the two picture elements continue in a horizontal scanning direction and continues in a vertical scanning direction and comparing sum totals of measured amounts in the blocks respectively with predetermined values so as to identify the image according to the compared results.

In addition, as another method using the feature parameters, Japanese Unexamined Patent Publication No. 62-147860/1987 (Tokukaisho 62-147860) discloses a half-tone facsimile signal processing method. In this method, a difference between a maximum signal level and a minimum signal level in the blocks is obtained, and the difference value is compared with a predetermined value. Then, when the level difference is smaller than the predetermined value, a judging signal, which represents that the signal level in a section including a photograph is changed mildly, is outputted, whereas when the level difference is larger than the predetermined value, a judging signal, which represents that the signal level in a section including contour of characters and a photograph or a mesh dot photograph is changed intensely, is outputted. Moreover, a number of changes between the two signal levels of the two picture elements which continues spatially is compared with a predetermined value according to order of access which is predetermined in the blocks, and according to the compared results, when the number of changes is larger than the predetermined value, a judging signal, which represents that the block is a mesh dot section, is outputted, whereas when the number of changes is smaller than the predetermined value, a judging signal, which represents that the block is not a mesh dot section, is outputted. Then, the picture elements in the blocks are subject to a signal process according to the respective judging signals.

An image process which improves image quality, a space filtering process is conventionally used. As an image processing method for improving the image quality by using the filtering process, for example, Japanese Examined Patent Publication No. 5-147860/1993 (Tokukohei 5-147860) discloses a half-tone facsimile signal processing method. In this method, a space filter which makes an image signal smooth and a space filter which enhances an image signal are prepared, and a signal, which smoothed the image signal and/or a signal which enhanced the image signal are/is mixed or selected based upon an output of edge detecting means which detects an edge section of the image signal. Moreover, another method is disclosed in Japanese Unexamined Patent Publication No. 63-246076/1988 (Tokukaisho 63-246076). In this method, a space filter, such as a filter processing device, which removes a mesh dot component is prepared, and when an edge section is not extracted by edge extracting means which extracts an edge section of an image signal, a signal, which has been subject to the filtering process for removing the mesh dot component, is outputted, whereas when an edge section is extracted, a signal, which has not been subject to the filtering process yet, is outputted.

However, the above-mentioned conventional image identification method has a disadvantage that misjudgment of the image identification occurs.

The cause for the misjudgment of the image identification is considered to be unsuitable feature parameters, namely, the feature parameters do not sufficiently represent respective properties of the regions. Besides, unsuitable classifying method for the image identification according to an amount of features obtained by the feature parameters and unsuitable selection of a threshold value for the classification also cause the misjudgment of the image identification.

In the conventional method of classifying and identification the blocks according to an amount of features obtained by the feature parameters so as to execute the filtering process on target picture elements in the blocks using a prepared space filter according to the identified results, great influence is exerted on image quality at the time of misjudgment, and an amount of features owned by the target picture elements reflects only limited filter characteristics. For this reason, there arises a problem that a delicate process such as the filtering process cannot be performed most suitably for the target picture elements.

Therefore, in the present embodiment, as disclosed in the U.S. patent application Ser. No. 08/540,580 (Japanese Patent Application No. 6-264232/1994) by the inventors of the present invention, an image signal obtained by scanning a document is subject to an identification process which identifies as to whether each picture element exists in a character region, a photographic region or a mesh dot region, and when each picture element is subject to an image process according to the results of the identification process, certain picture element data of the image signal is used as a target picture element, and image data in a local block, which composed of the target picture element and a plurality of picture elements in the vicinity of the target picture element, are stored in a block memory.

Next, according to the image data in the local block stored in the block memory, a plurality of feature parameters, which respectively represent features of the character region, the photographic region and the mesh dot region, is obtained. A multi-dimensional identification process is executed by identification means which selects each of the character region, the photographic region and the mesh dot region divided by borderlines including a non-linear characteristics in a multi-dimensional plane including axis of the above feature parameters and which is composed of a neural network which learned beforehand for receiving each feature of the plural feature parameters and outputting region identification information according to each input. Namely, the identification process is performed not by setting a threshold value for each feature parameter but based on the borderlines including non-linear characteristic based on which the multi-dimensional space is divided by feature parameters.

According to the described method, even if an identification cannot be performed with a desired accuracy when considering only one feature parameter, by taking plural feature parameters into consideration, the identification of the region where the target picture element is located can be performed with an improved accuracy. Furthermore, as a multi-dimensional identification process is performed using a neural network which receives each input of plural parameters, an identification can be performed with very high precision.

In addition, the region identification information outputted by the identification means is data which respectively represent likelihoods of the character region, the photographic region and the mesh dot region in a region of the block in which the target picture element exists by numerals. Namely, the identification means outputs a possibility of characters which is a numeral representing a character region in a region of a block where a target picture element exists, a possibility of photographs which is a numeral representing a photographic region in a region of a block where a target picture element exists, and a possibility of mesh dots which is a numeral representing a photographic region in a region of a block where a target picture element exists.

According to the above manner, the possibilities of characters, photographs and the mesh dots in each picture element are detected. Then, data, which are used for obtaining the possibilities of characters, photographs and mesh dots from the feature parameters (for example, a difference between the maximum density value and the minimum density value in a certain block for picture elements in the vicinity of the target picture element), are region segmentation data, and the region segmentation data are determined by the aforementioned method.

Then, as mentioned above, in the present embodiment, the above-mentioned data, namely, the region segmentation data 3b, can take a value X which falls within the range of 0 to N−1 (N: an integral number of not less than 2).

In the space filtering process suggested in the U.S. patent application Ser. No. 08/540,580, various filters in which filter coefficients were predetermined are selected based upon the identification signal. More concretely, the filter coefficients are determined per processed picture element based upon the data representing likelihood of each region by numerals so that the space filtering process is performed.

Next, the variable scaling section 4 performs the variable scaling process on the inputted image data 3a and region segmentation data 3b, namely, enlarges or reduces of the inputted image data 3a and region segmentation data 3b so as to output scaling-processed image data 4a which are scaling-processed image data, and magnification varied region segmentation data 4b which are scaling-processed region segmentation data, and judges slope of density of a current picture element by referring to peripheral picture elements so as to output special data 4c.

At the time of the variable scaling process, interpolation represented by an operation expression, mentioned later, is used as the image data 3a, and nearest neighbor interpolation is used for processing the region segmentation data 3b. Moreover, the special data 4c are composed of directing data, which represent the front and rear of a line of the region segmentation data 3b and end of the image data, and data, which represents slope of density of a picture element being processed currently (i.e., "picture element density slope data").

In addition, the picture element density slope data are outputted as data representing "No slope" except that the region segmentation data 3b has a strong possibility of characters. Namely, the variable scaling section 4 outputs "No slope" as the picture element density slope data except that the region segmentation data 3b has a value representing a strong possibility of characters (here, 0).

Since the variable scaling process for an image in the vertical scanning direction of a digital copying machine is adjusted by changing a speed of an optical system, the image data 3a is subject to the variable scaling process by the variable magnification processing section 4 in only the horizontal scanning direction of the digital copying machine.

The γ correcting section 5 performs the γ correcting process on the inputted scaling-processed image data 4a.

The output control section 6 is also called as a pulse width modulator, and controls an output of an image. The image output section 7 outputs a laser based upon a signal of the output image data 6a inputted to the image output section 7.

In the digital copying machine of the present embodiment, the input image data 1a, the image data 2a and 3a, the scaling-processed image data 4a and the scaling-processed γ corrected image data 5a are respectively composed of 8 bits per picture element (namely, each picture element takes a value of 256). Moreover, the output image data 6a is aggregate of signals with 256 pulses per picture element. The output control section 6 creates data as to how many pulses of 256 pulses obtained by dividing one picture element into 256 is turned on, based upon a value of the inputted scaling-processed γ corrected image data 5a, and represents density by outputting the created data.

In addition, the region segmentation data 3b and the scaling-processed region segmentation data 4b are respectively composed of 3 bits per picture element (namely, each picture element takes a value of 8). Further, the special data 4c are composed of a total of 5 bits: 2 bits of the directing data representing the front and rear of a line and end of image data; and 3 bits of the picture element density slope data in a picture element being processed currently. Moreover, the special data 4c are combined with the scaling-processed region segmentation data 4b so as to take a value of 8 bits per picture element.

The following describes an image processing method relating to the variable scaling process in the digital copying machine having the above arrangement.

Figure 2:
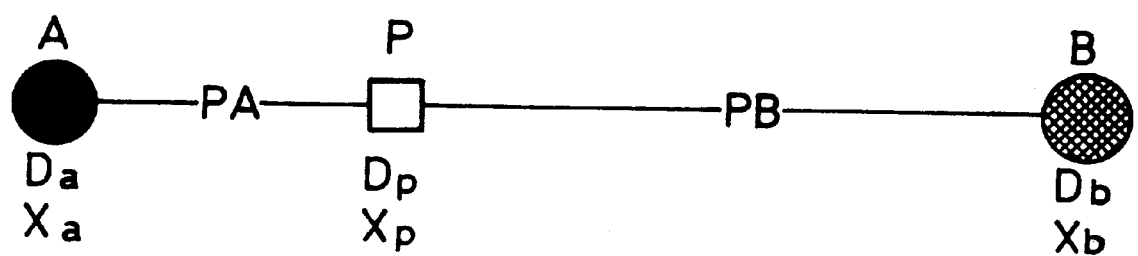
FIG. 2 is an explanatory drawing which explains an image processing function of the digital copying machine.

As shown in FIG. 2, when density in a position P of a picture element after the variable scaling process, namely, output picture element density $D_p$ is determined, a simple summing and multiplying operation is performed by using a picture element A which has density $D_a$ and region segmentation data $X_a$, and is the nearest to the picture element P (i.e., "nearest neighbor picture element"), a picture element B which has density $D_b$ and region segmentation data $X_b$, and is the second nearest to the picture element P (i.e., "second nearest neighbor picture element"), and distances PA and PB between the picture elements P, A and B.

The above summing and multiplying operation is performed in the variable scaling section 4.

Figure 3:
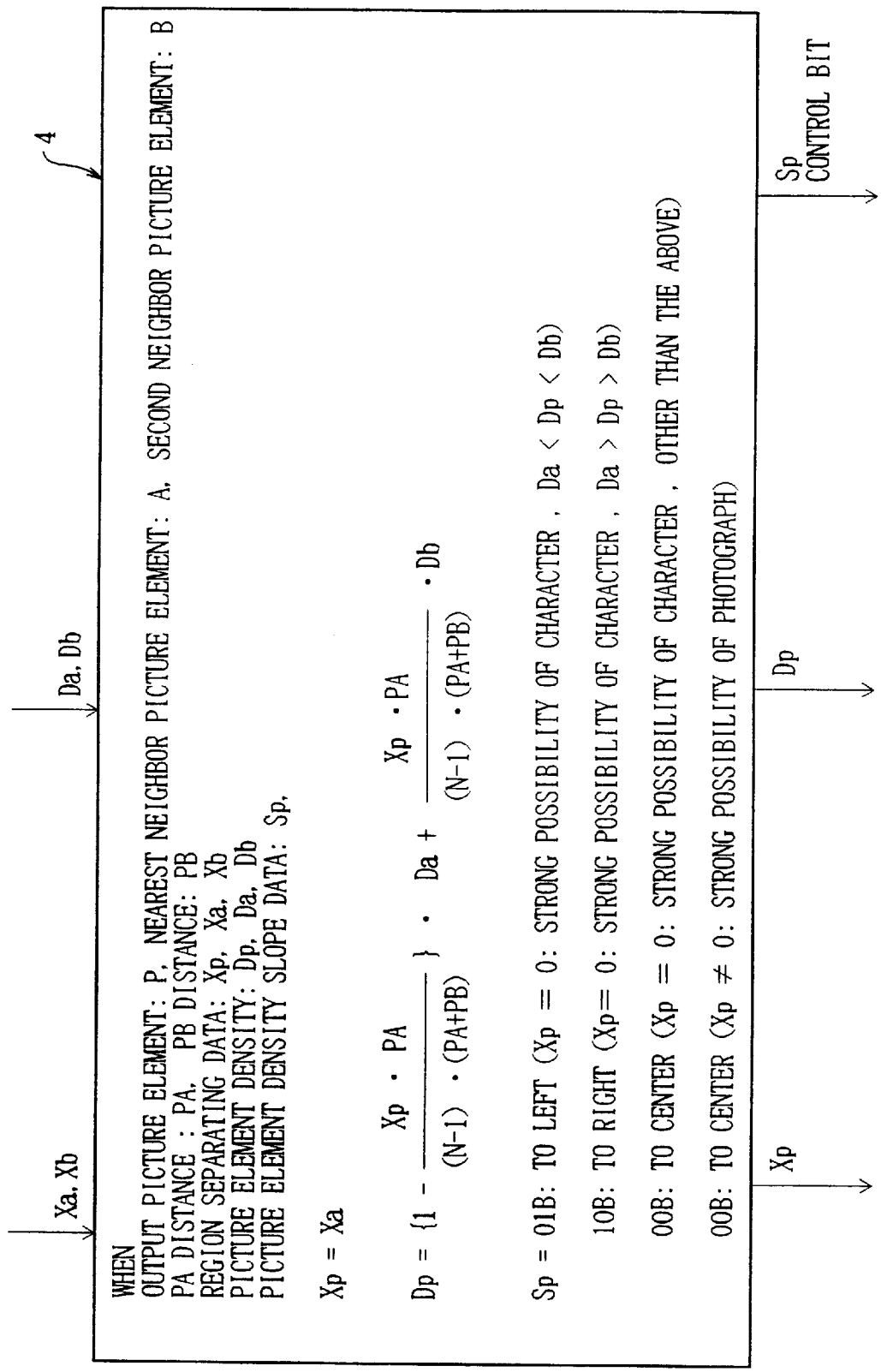
FIG. 3 is an explanatory drawing which shows a computing process of a variable scaling section in the digital copying machine.

As shown in FIG. 3, the region segmentation data $X_a$ and the density $D_a$ in the nearest neighbor picture element A, and the region segmentation data $X_b$ and the density $D_b$ in the second nearest neighbor picture element B are inputted into the variable scaling section 4. Outputs of the variable scaling section 4 are output picture element region segmentation data $X_p$ as the magnification varied region segmentation data 4b, output picture element density $D_p$, data representing a position of the output picture element used in the output control section 6, i.e., the picture element density slope data $S_p$, and bits for controlling the directing data representing the front and rear of a line and the end of an image data.

In the variable scaling section 4, when the output picture element region segmentation data $X_p$ is computed, a relationship $X_p = X_a$ is fulfilled by the nearest neighbor interpolation. Namely, the nearest neighbor interpolation directly uses data of a picture element exist in the nearest neighbor as the output data of picture element.

Meanwhile, the output picture element density $D_p$ is computed according to the following equation.

$$D_p = (1-K) \times D_a + K \times D_b \quad (1)$$

$$(\text{Here, } K = (X_p/N-1) \times (PA/(PA+PB))) \quad (2)$$

In the present embodiment, since a number of separations of the region segmentation data is set to 8, the value N−1 in the equation (2) is computed according to the equation N−1=8−1=7.

When the output picture element region segmentation data $X_p$ takes a value representing that the possibility of characters is strongest, namely, $X_p=0$, the equation (1) becomes as follows:

$$D_p = D_a$$

and thus the equation (1) represents the nearest neighbor interpolation. Namely, the nearest neighbor interpolation directly uses the density of the picture element A as the density of the output picture element D.

In addition, when the output picture element region segmentation data $X_p$ takes a value representing the strongest possibility of photographs, namely, $X_p=N-1=7$, the equation (1) becomes as follows:

$$D_p = (PB \cdot D_a + PA \cdot D_b)/(PA+PB)$$

and thus the equation (1) represents the interpolation of first degree. Namely, the interpolation of first degree uses linearly weighted mean of weighing the density of the picture element A with the density of the picture element B as the density of the output picture element D is determined.

Next, when $X_p=0$, namely, the block of a picture element is judged to be characters in the region segmentation process, the relationship $D_a < D_p < D_b$ is fulfilled. Moreover, when $D_p$ is on the left side of $D_a$, data representing the position of an output picture element in one picture element, i.e., the picture element density slope data $S_p$ the picture element density slope data $S_p$ becomes data representing that a picture element is outputted in a position which is shifted to the left, namely, $S_p=01B$ (B is binary display).

Meanwhile, when $X_p=0$, $D_a > D_p > D_b$, and $D_p$ is on the right side of $D_a$, $S_p$ becomes data representing that a picture element is outputted in a position which is shifted to the right, namely, $S_p=10B$. Furthermore, when $X_p=0$ and the condition of $D_a$, $D_b$ and $D_p$ is other than the above, $S_p$ becomes data representing that a picture element is outputted in a central position, namely, $S_p=00B$.

In addition, when $X_p \neq 0$, namely, the picture element density slope data $S_p$ are judged not to be characters in the region segmentation process, $S_p$ becomes data representing that a picture element is outputted in the central position, namely, $S_p=00B$.

When output picture element P is a front or rear of a line or an end of a page, corresponding directing data are added to the picture element density slope data $S_p$ so that the special data 4c are outputted.

As shown in FIG. 1, the data of the output picture elements P, namely, the scaling-processed image data 4a, the scaling-processed region segmentation data 4b and the special data 4c are respectively inputted to the output control section 6 after the scale-processed image data 4a is subject to the γ correction.

The following describes a detailed operation of the output control section 6.

Figure 4:
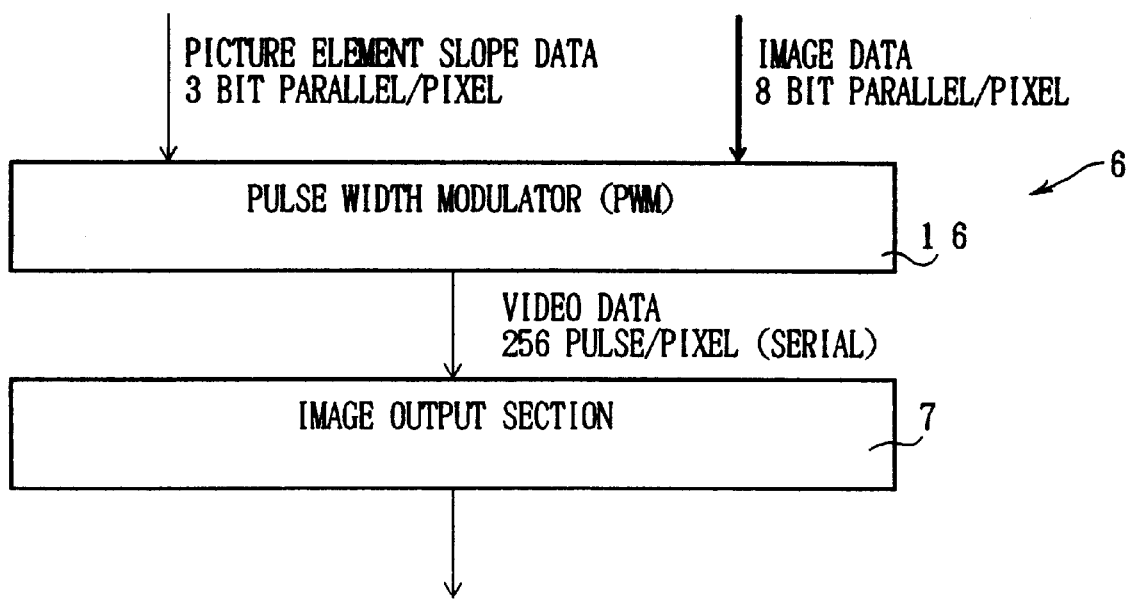
FIG. 4 is a block diagram which shows an output control section and an image output section in the digital copying machine.

As shown in FIG. 4, in the output control section 6, a pulse width is modulated by the pulse width modulator 16.

Inputs of the pulse width modulator 16 are image data of 8 bits per picture element which are composed of the scaling-processed γ corrected image data 5a and the magnification varied region segmentation data 4b, and picture element density slope data of 3 bits per picture element which are included in the special data 4c.

The image data and the picture element density slope data are synchronously inputted to the pulse width modulator in parallel. Outputs of the pulse width modulator 16 are serial video data which are divided into 256 per picture element. The pulse width modulator 16 control a laser of the image output section 7 according to pulses of an ON signal of 1/256 picture element based upon the input image data of 8 bits per picture element, namely, with value of 256, and controls the density of one picture element by 256 steps.

In addition, the pulse width modulator 16 refers to the density slope data so as to determine a position of one picture element where continuous ON signals are allowed to be generated. Namely, when the picture element density slope data $S_p$ of 3 bits per picture element are 01B which represents that they are shifted to the left, the continuous ON signals are allowed to be generated at the front of the picture element, and when the picture element density slope data are 10B which represents that they are shifted to the right, the continuous ON signals are allowed to be generated at the rear of the picture element. Moreover, when the picture element density slope data $S_p$ are 00B which represents that they are centered, the continuous ON signals are allowed to be generated at the center of the picture element.

Figure 5A:
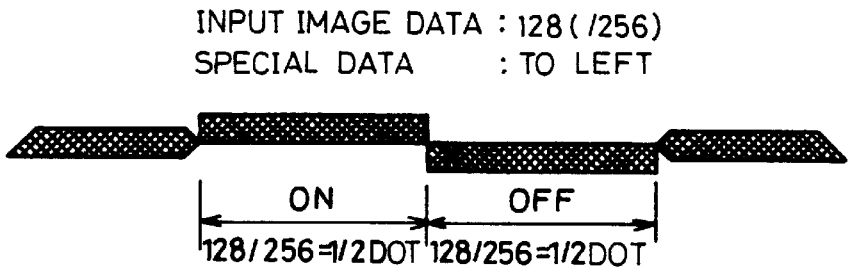
FIGS. 5(a) through 5(c) are explanatory drawings which show output examples of a pulse width modulator on each picture element.

More concretely, as shown in FIG. 5(a), when input image data are 80 H, i.e., have 128/256 density, and the input picture element density slope data of the special data are 10B, namely, they are shifted to the left, half (128/256) picture element from the front of the picture element is turned on, and the rest of half picture element is turned off.

Figure 5B:
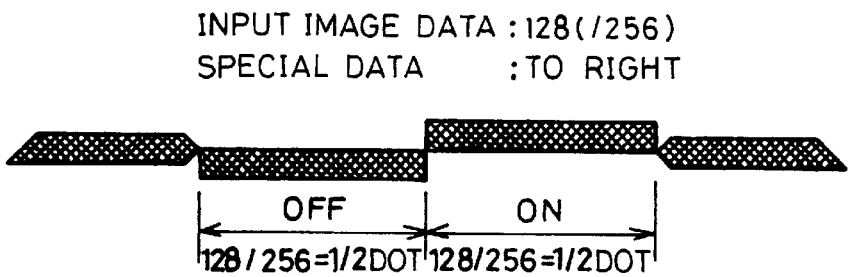

In addition, as shown in FIG. 5(b), when input image data are 80 H . i.e., have 128/256 density, and the input picture element density slope data of the special data are 01B, namely, they are shifted to the right, half (128/256) picture element from the front of the picture is turned off, and the rest of a half picture element is turned on.

Figure 5C:
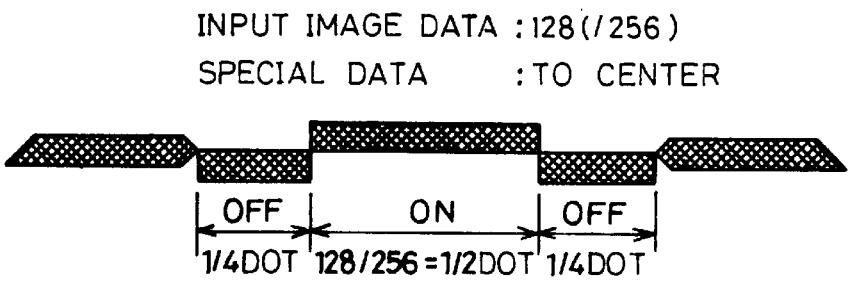

Furthermore, as shown in FIG. 5(c), input image data are 80 H, i.e., have 128/256 density, and the input image density slope data of the special data are 00B, namely, they are centered, one-fourth (64/256) picture element from the front of the picture element is turned off, a next half picture element is turned on, and the rest of one-fourth picture element is turned off.

In such a manner, the pulse width modulator 16 adjusts outputs of the laser so as to change a position of ON data within one picture element.

The following details a variable scaling process of an image with variable density, i.e., an image with density tone according to the equation (1).

Figure 6:
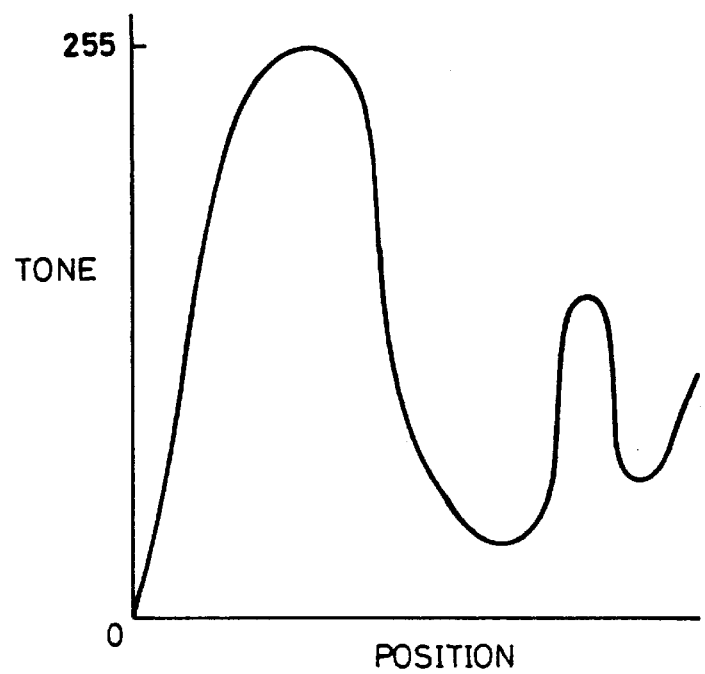
FIG. 6 is a graph which shows an original image having tone.

An example is given as to an original image having density tone shown in FIG. 6. A vertical axis represents the density of the original image. In this case, when the original image is a white image, the density value is 0, and when the original image is a black image, the density value is 255. Moreover, a horizontal axis represents a position where the above density is obtained.

Figure 7:
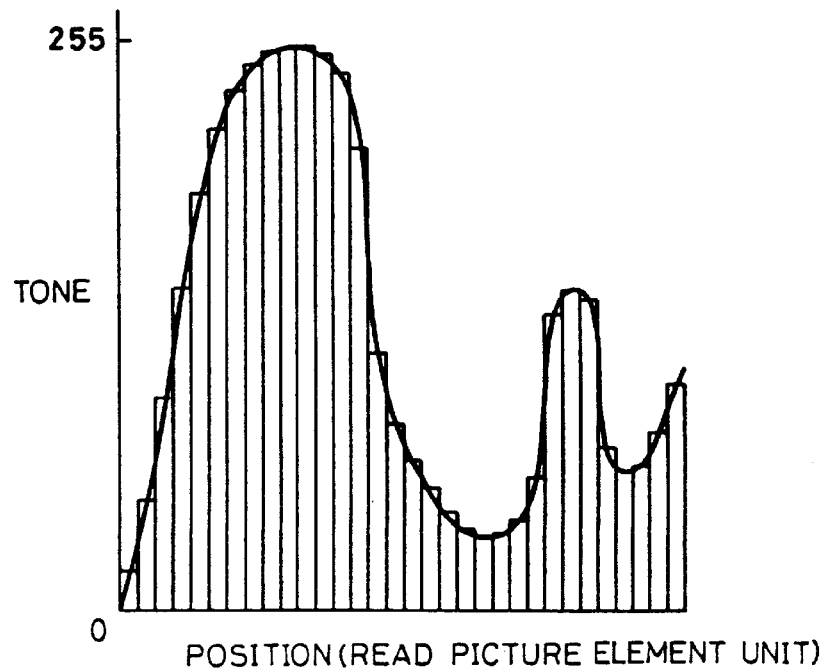
FIG. 7 is a graph which shows density of read picture elements when the original image shown in FIG. 6 is read.

When an original image having density tone shown in FIG. 6 is read by the image input section 1, as shown in FIG. 7, the original image is divided according to each picture element. A vertical axis in FIG. 7 represents density values, which are integral numbers of 8 bits, i.e., 0 to 255. On the horizontal axis, the position in FIG. 6 is divided by a unit of one read picture element, and rectangles of the graph respectively represent the density values of the read picture elements per read picture element unit.

Figure 8:
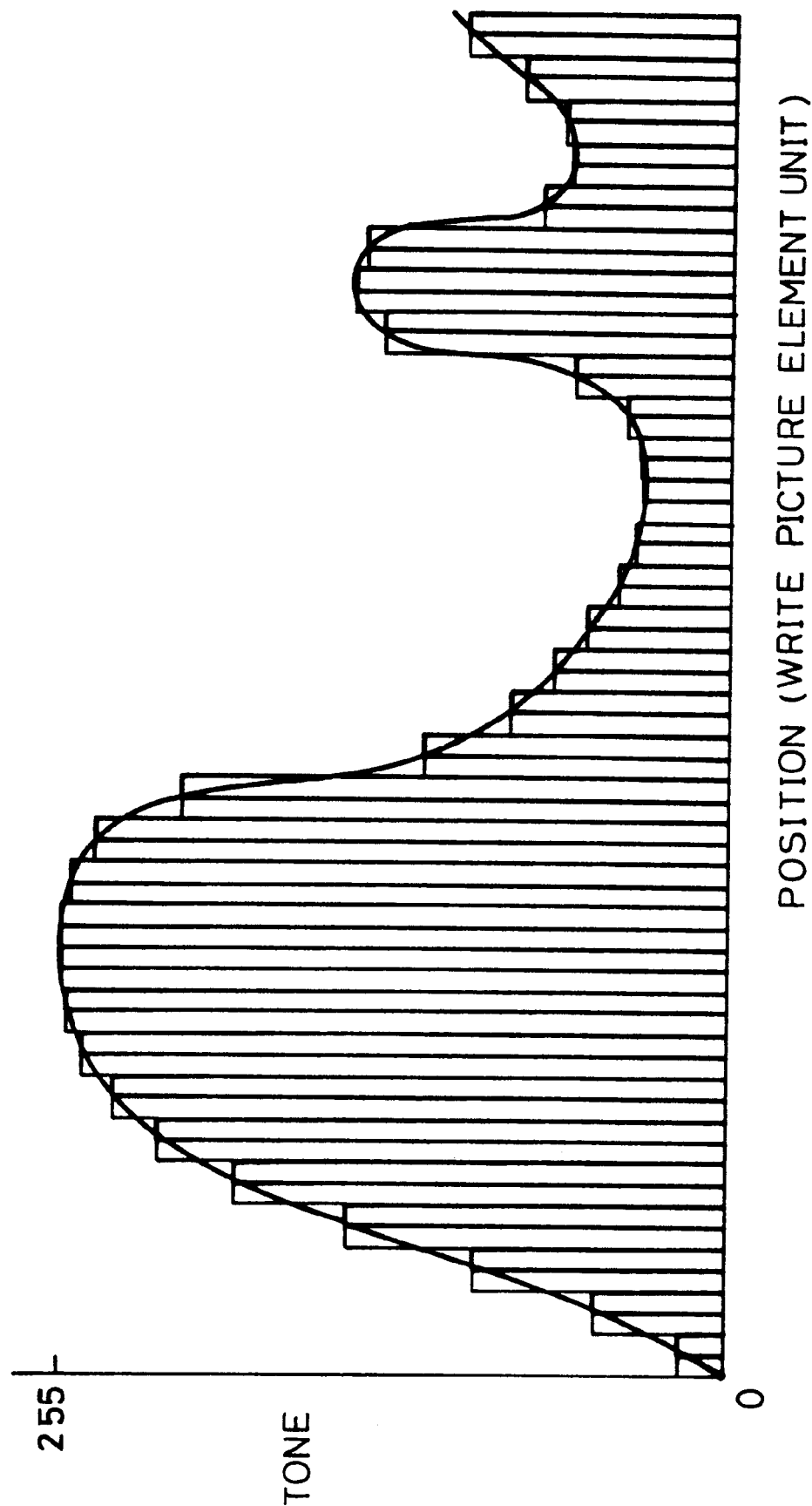
FIG. 8 is a graph which shows an output in the case of using a nearest neighbor interpolation when the read picture elements shown in FIG. 7 are enlarged by twice.

Next, when the read picture elements shown in FIG. 7 are enlarged twice by using the nearest neighbor interpolation, the read picture elements are represented by FIG. 8. In FIG. 8, a vertical axis represents density values which are integral numbers of 8 bits, i.e., 0 to 255. Moreover, a horizontal axis represents a position in a write picture element unit. Further, rectangles of the graph respectively represent density values of a write picture element in a unit of one write picture element.

Since the variable scaling process in this case is the nearest neighbor interpolation, data, in which a rectangle with the same shape is arranged next to each rectangle of the read picture element unit shown in FIG. 7, namely, data, in which two picture elements having the same density make a pair, are obtained. According to this method, an image having a comparatively clear edge is obtained for a binary image such as characters. However, a variation of the density cannot be precisely reproduced for an image such as a photographic image whose density is successively changed. As a result, a so-called pseudo-contour is caused.

Here, the pseudo-contour is a contour which is caused when continuity of variation of density in a variable density image is lost, and does not exist in an original image (see p. 481 "Handbook of Image Analysis", first edition published by the Publishing Foundation, the University of Tokyo: the supervision of Mikio Takagi and Shimoda).

Therefore, as for an image such as a photographic image whose density is successively changed, it is preferable that the variable scaling process is performed by using the interpolation of first degree.

Figure 9:
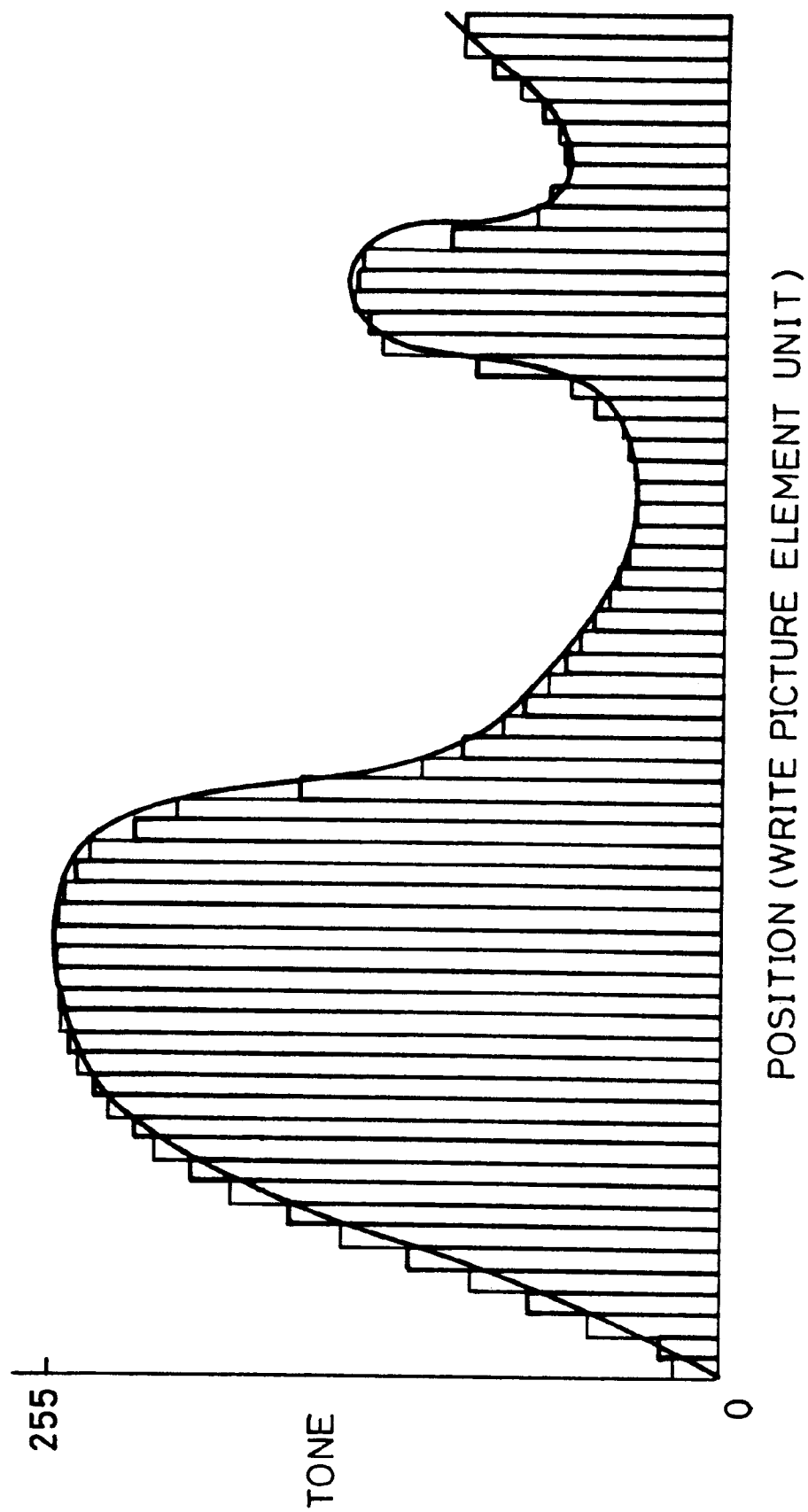
FIG. 9 is a graph which shows an output in the case of using interpolation of first degree when the read picture elements shown in FIG. 7 are enlarged by twice.

In other words, the original image read data shown in FIG. 7 are enlarged twice by using the interpolation of first degree, they are represented FIG. 9.

According to the interpolation of first degree, a picture element having density, which is the same as a mean of densities of two read image data, is interpolated between the two continuous read image data. According to this method, as for an image such as a photographic image whose density is successively changed, the variation of density of the original image can be reproduced comparatively definitely and faithfully, but as for a binary image such as characters, an image whose contour is not clear is reproduced.

Therefore, in the case where characters, photographs, etc. coexist in an image, if the nearest neighbor interpolation or the interpolation of first degree is selected indiscriminately, there arises a problem.

This is described concretely on reference to the drawings.

Figure 10:
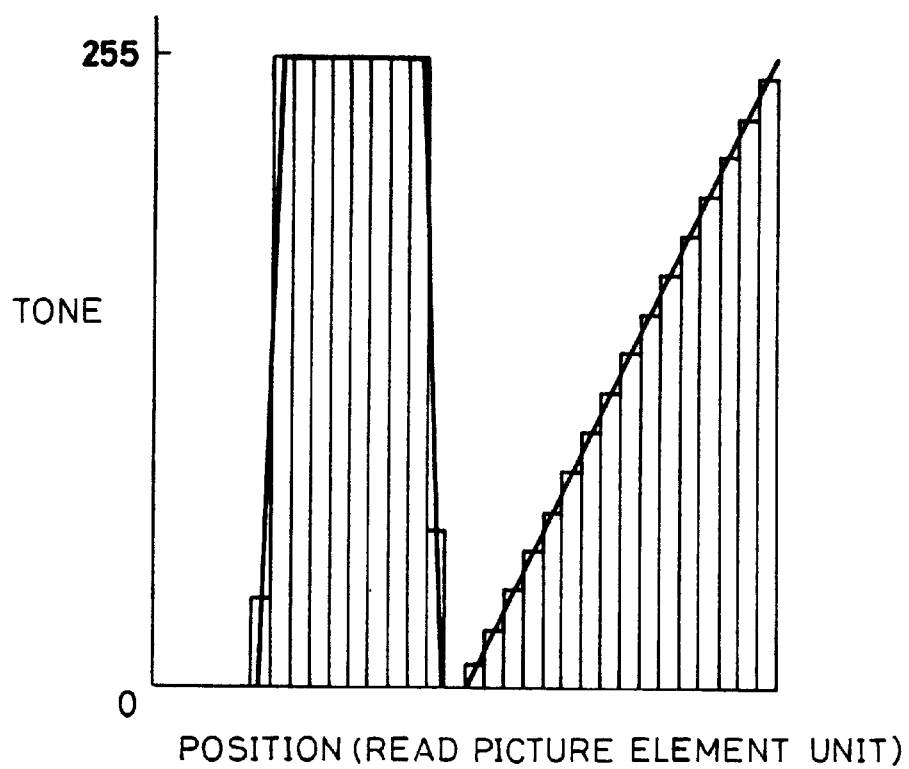
FIG. 10 is a graph which shows read density data when an image in which characters and photographs coexist is read.

First, read density data which is obtained by reading an image in which characters and photographs coexist are shown in FIG. 10, for example. The left half of FIG. 10 illustrates a character region, and its feature is such that the density changes rapidly. On the contrary, the right half of FIG. 10 illustrates a photographic region, and its feature is such that the density changes continuously and comparatively mildly.

Figure 11:
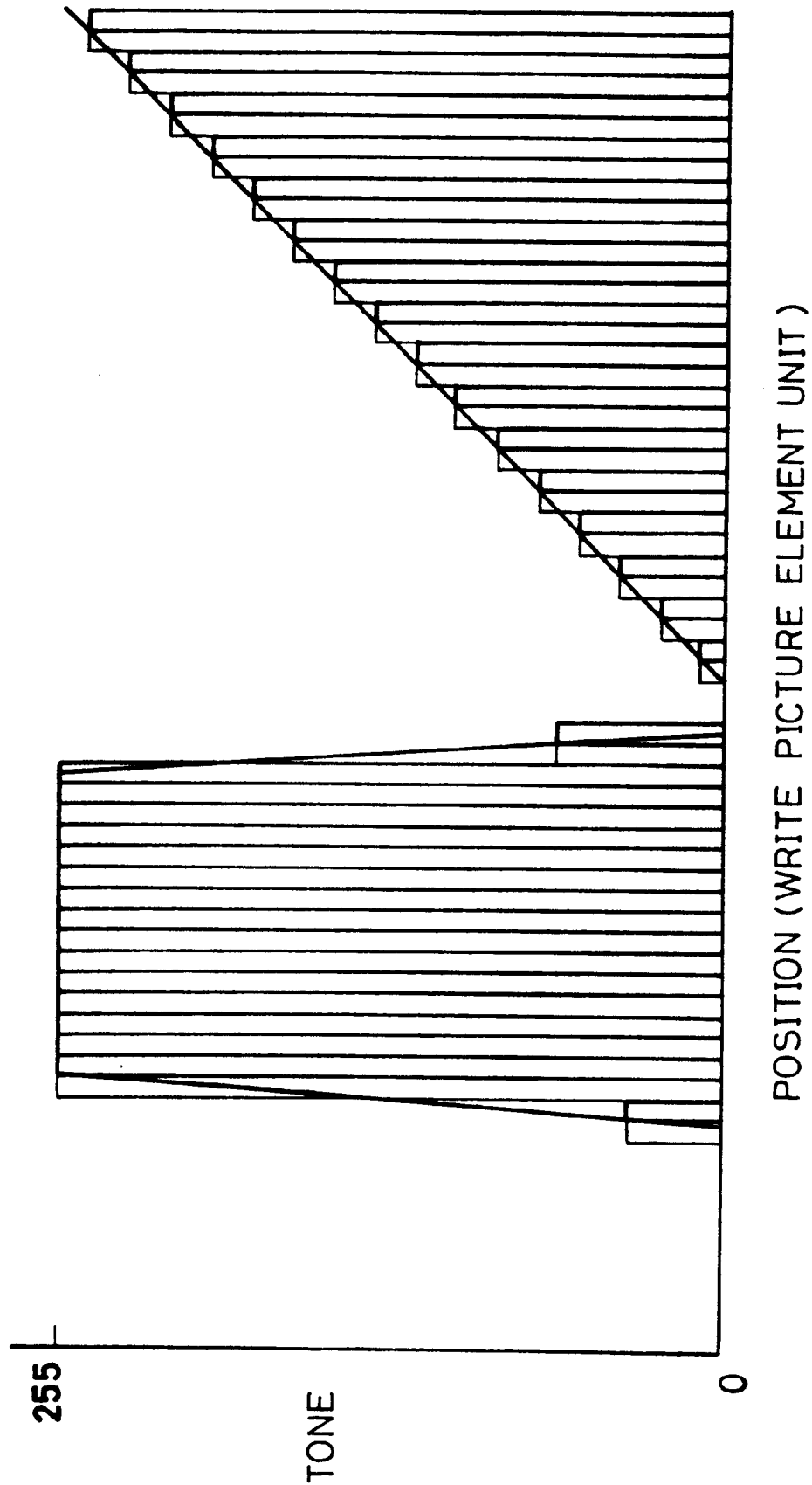
FIG. 11 is a graph which shows an output in the case of using the nearest neighbor interpolation when the read picture elements shown in FIG. 10 are enlarged by twice.

When the read image is enlarged twice by the nearest neighbor interpolation, the image represented by FIG. 11 is obtained.

In this case, since the nearest neighbor interpolation is used, the edge of the left half, namely, the character region of the image is comparatively emphasized, and thus the image becomes clear. However, the right half, namely, the photographic region has unsatisfactory tone production, and thus a pseudo-contour is liable to be caused.

Figure 12:
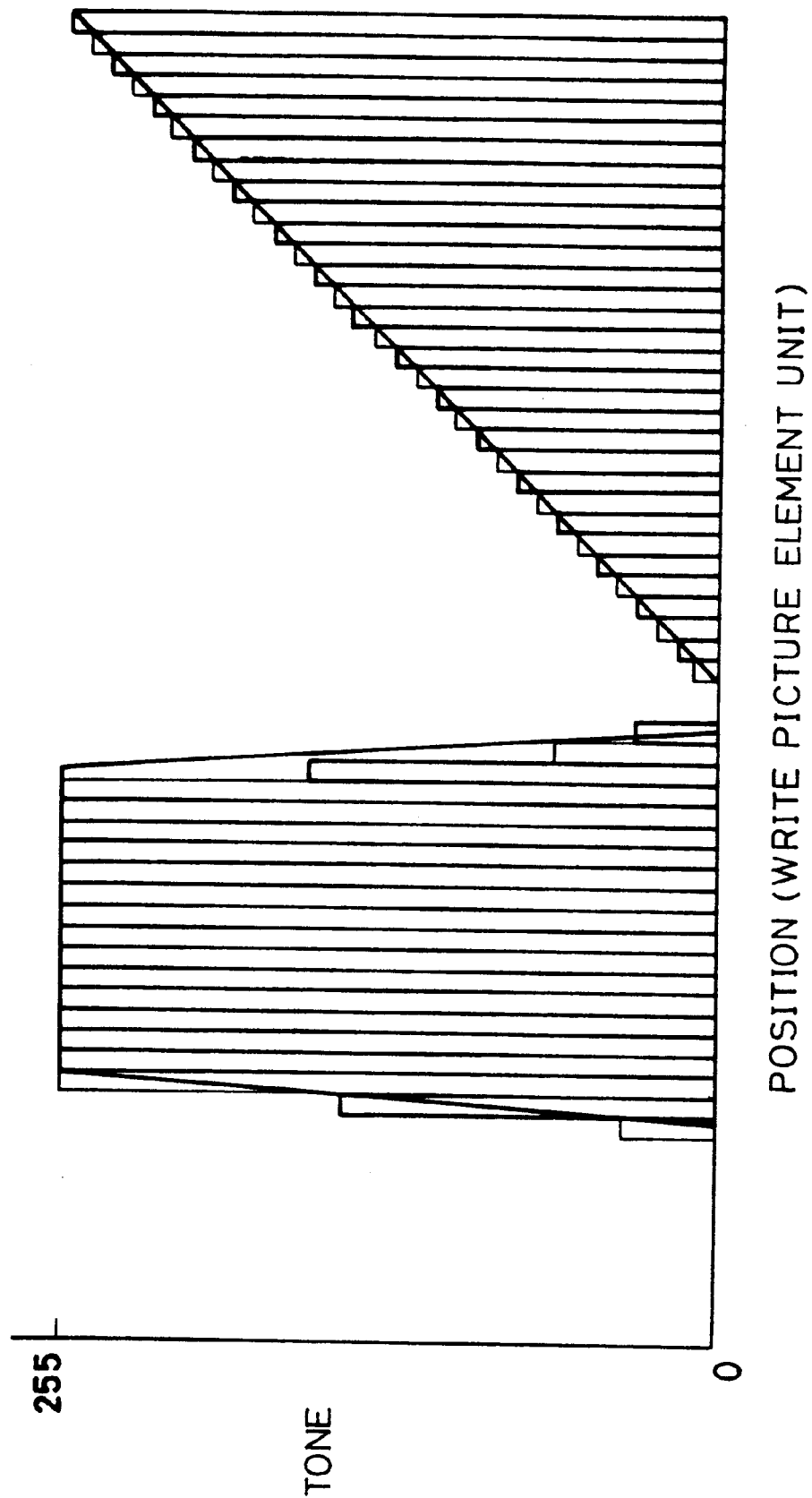
FIG. 12 is a graph which shows an output in the case of using the interpolation of first degree when the read picture elements shown in FIG. 10 are enlarged by twice.

Meanwhile, when the read image shown in FIG. 10 is enlarged twice by the interpolation of first degree, the image represented by FIG. 12 is obtained.

In this case, the interpolation of first degree causes an image whose left half, namely, character region has an unclear edge. However, the right half, namely, the photographic region has satisfactory tone production, and thus a pseudo-contour is difficultly caused.

In such a manner, it is not preferable that the nearest neighbor interpolation or the interpolation of first degree is indiscriminately selected for a whole image.

Therefore, in the present embodiment, in the case where characters and photographs coexist in a read image, the nearest neighbor interpolation or the like is used for the characters, and the interpolation of first degree or the like is used for the photographs.

The following describes the variable magnification process using the above methods.

In other words, in the present embodiment, the region segmentation section 3 detects possibilities of characters, photographs and mesh dots on a picture element so as to output the detected possibilities as the region segmentation data 3b. Then, calculation is made according to the equation (1) based upon the region segmentation data 3b. When the output picture element region segmentation data $X_p$ takes a value representing the strongest possibility of characters, namely, $X_p=0$, the equation (1) becomes as follows:

$$D_p = D_a$$

and thus the nearest neighbor interpolation is used. Moreover, when the output picture element region segmentation data $X_p$ takes a value representing the strongest possibility of photographs, namely, $X_p=7$, the equation (1) becomes as follows:

$$D_p = (PB \cdot D_a + PA \cdot D_b)/(PA+PB)$$

and thus the interpolation of first degree is used.

Figure 13:
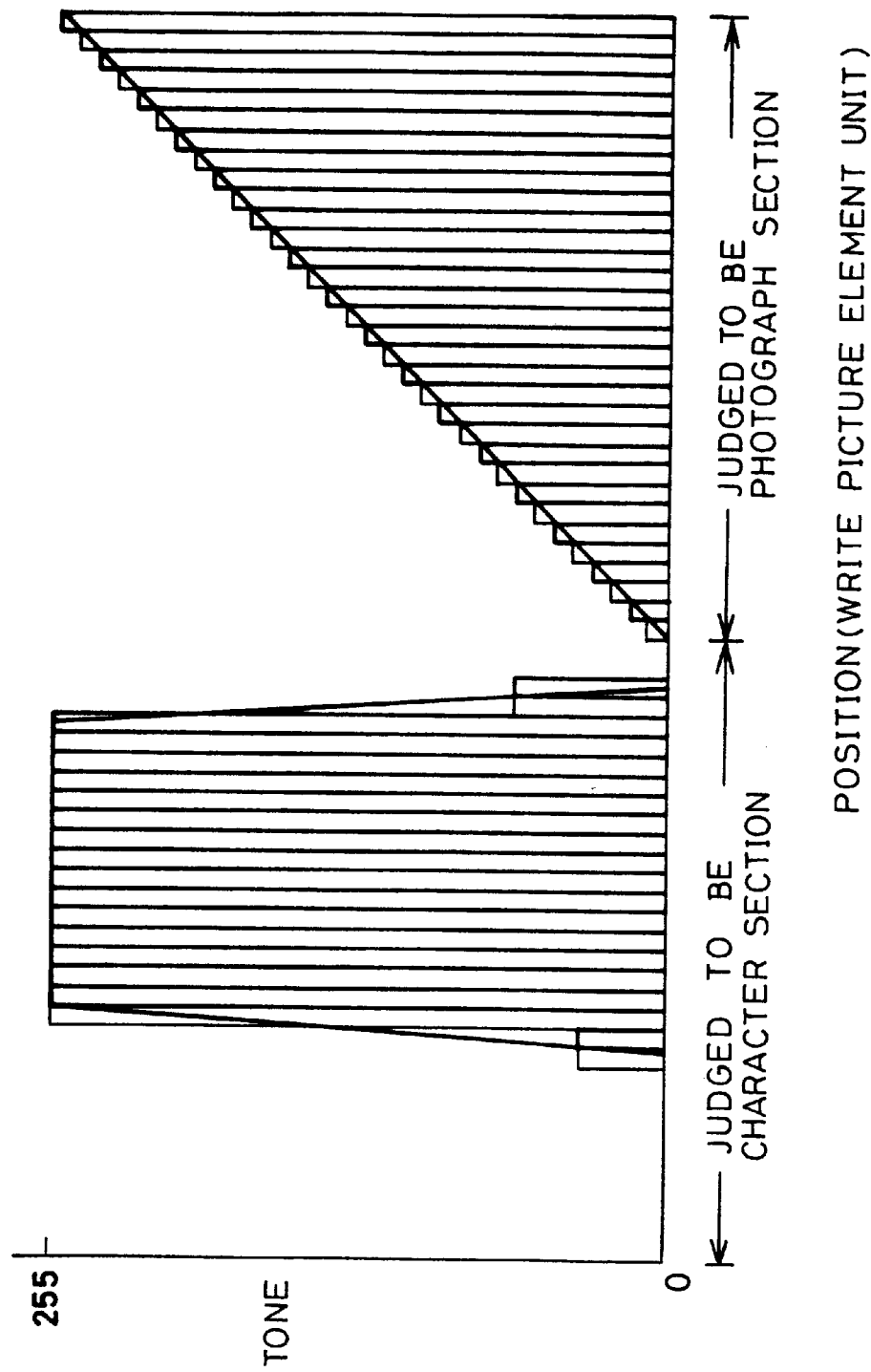
FIG. 13 is a graph which shows an output in the case of using the nearest neighbor interpolation in a section judged to be characters and using the interpolation of first degree in a section judged to be a photograph when the read picture elements shown in FIG. 10 are enlarged by twice.

An output image obtained by the above computation is shown in FIG. 13. In other words, FIG. 13 is a graph which shows outputs in the case where when the read picture element shown in FIG. 10 is enlarged twice according to the region segmentation data 3b, two kinds of the variable scaling processes are used. Namely, when the picture element is judged to be a character section, the nearest neighbor interpolation is used, and when the picture element is judged to be a photographic section, the interpolation of first degree is used.

In this case, on the section which was judged to be the character section in the region segmentation section 3, namely, the left section, the edge is enhanced by using the nearest neighbor interpolation as the variable scaling method, and thus a clear image is obtained. Moreover, in the region segmentation section 3, when the interpolation of first degree is used as the variable scaling method for the section which was judged to be a photographic section, namely, the right half, the tone production becomes satisfactory, and thus a pseudo-contour is difficultly caused.

In such a manner, at the time of variable magnification process, referring to the region segmentation data 3b, the variable magnification process which is closer to the nearest neighbor interpolation is used on a section with the strong possibility of characters, and the variable magnification process which is closer to the interpolation of first degree is used on a section with the strong possibility of photographs. As a result, the density data which is scaling-processed can be made the most suitable.

As mentioned above, in the image processing method of the present embodiment which reads an image and divides the read image into blocks composed of a plurality of picture elements and performs a variable scaling process such as enlargement and decreasing of an image by making interpolation per picture element, possibilities of characters, photographs and mesh dots on each picture element on the image are detected by the region segmentation section 3, and interpolated picture element data per picture element are calculated by the variable scaling section 4 based upon the results of the detection so that scaling of the image is performed.

In other words, in the conventional method of selecting the nearest neighbor interpolation or the interpolation of first through third degrees, at the time of the enlarging process of the variable scaling process, i.e., enlargement, when the nearest neighbor interpolation is selected for the case where characters, photographs, etc. coexist in a document image, a pseudo-contour is occasionally caused on the photograph region, and when the interpolation of first through third degrees is selected, an edge of the characters becomes unclear.

However, in accordance with the above method, the possibilities of characters, photographs and mesh dots on each picture element on an image are detected by the region segmentation section 3, and the interpolated picture element data per picture element are computed by the variable scaling section 4 based upon the detected results so that scaling of the image is performed.

Therefore, a section with the strong possibility of characters is enlarged by the nearest neighbor interpolation or the like, and thus an edge of the enlarged characters is prevented from becoming unclear. Meanwhile, a section with the strong possibility of photographs is enlarged by calculation which is closer to the interpolation of first through third degrees, and thus a pseudo-contour of the enlarged photograph is prevented from being caused.

As a result, even if characters, photographs and mesh dots coexist on an image read by a scanner, a deterioration in image quality can be prevented by scaling the image according to the characters, photographs or the mesh dots.

In addition, in the image processing method of the present embodiment, the region segmentation data representing the possibilities of characters, photographs and mesh dots detected by the region segmentation section 3 can take a value X which falls within a range of 0 to N−1 (N is an integral number of not less than 2) (the smaller the value X is, the stronger the possibility of characters is, and the larger the value X is, the stronger the possibility of photographs or mesh dots). Moreover, when the region segmentation data of an interpolation picture element P whose density is should be determined is represented by $X_p$, the density of the picture element A which is the closest to the picture element P is represented by $D_a$, the density of the picture element B which is the second closest to the picture element P is represented by $D_b$, a distance between the picture elements P and A is represented by PA, and a distance between the picture elements P and B is represented by PB, the variable magnification processing section 4 computes the density $D_p$ of the picture element P according to the aforementioned equation (1).

In other words, sections of characters and sections of photographs and mesh dots mostly coexist on an actual image, and thus if the variable magnification method such as pattern matching is used for each picture element of the above-mentioned image, there arises problems that a lot of memories are required for performing precise variable magnification process and that the processing time becomes longer.

However, in accordance with the above method, the variable magnification processing section 4 performs the computation according to the equation (1). Then, in the equation (1), if the region segmentation data $X_p$ take a value 0 representing complete character, K=0 and $D_p=D_a$. Namely, this means the variable scaling process by means of the nearest neighbor interpolation.

Meanwhile, if the region segmentation data $X_p$ takes a value N−1 representing a perfect photograph, for example, the density $D_p$ becomes as follows:

$$D_p = (PB \cdot D_a + PA \cdot D_b)/(PA+PB)$$

and thus $D_p$ becomes a weighted linearly arithmetic means of the density $D_a$ of the picture element A which is the closest to the picture element P and the density $D_b$ of the picture element B which is the second closest to the picture element P. Namely, this means the variable scaling process by means of the interpolation of first degree.

If the region segmentation data $X_p$ takes a value between the possibilities of characters and photographs which fall within a range of more than 0% to less than 100%, the density can be calculated based upon the weight according to the equation (1).

Here, when the weighted linearly arithmetic means of $D_a$ and $D_b$ is represented by $D_{ab}$, the aforementioned equation (1) can be changed as follows:

$$D_p = \{1-(X_p/(N-1))\} \times D_a + (X_p/(N-1)) \times D_{ab}$$

As is clear from the above equation, when N is an integral number of not less than 3, the region segmentation data $X_p$ fulfills a relationship $0<X_p<N-1$, namely, obtains a value between the possibilities of characters and photographs which falls within a range of more than 0% to less than 100%, $D_p$ becomes a weighted linearly arithmetic mean of $D_a$ and $D_{ab}$. Then, as $X_p$ is smaller, $D_p$ takes a value which is closer to $D_a$, and as $X_p$ is larger, $D_p$ takes a value which is closer to $D_{ab}$.

Therefore, even if characters and photographs or mesh dots coexist in an image, during the variable scaling process, a simple summing and multiplying operation represented by the equation (1) is performed based upon the region segmentation data which represent the possibilities of characters, photographs and mesh dots detected by the region segmentation means. More specifically, the variable scaling method which is closer to the nearest neighbor interpolation is used for the section with the strong possibility of characters ($X_p$ is small), and the variable scaling method which is closer to the interpolation of -first degree is used for the section with the strong possibility of photographs ($X_p$ is large). As a result, more suitable density can be determined for the magnification varied data. Namely, since the density can be determined suitably for the characters, photographs or mesh dots on each picture element by excellent software, the density can be determined quickly by a simple arrangement of hardware, and a deterioration in image quality can be prevented.

In the present embodiment, the interpolation of first degree is used for determining density, but the method is not limited to this, and thus the interpolation of second or third degree can be used, for example.

In addition, the above explanation refers to the enlarging process of the variable magnification process, but the image processing method of the present embodiment is not necessarily limited to this, and thus this process can be applicable to the case where decreasing process is performed.

Figure 14:
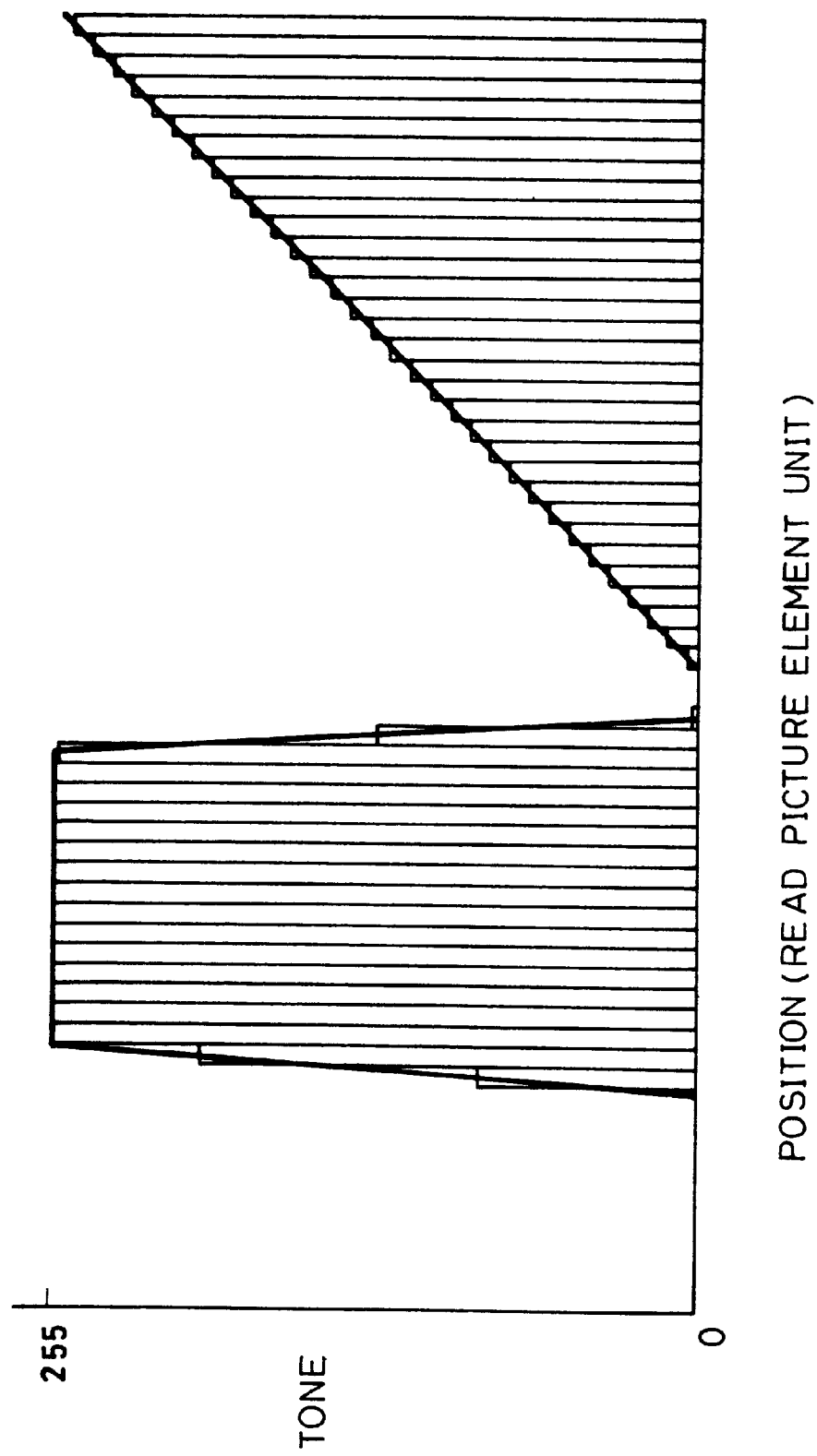
FIG. 14 is a graph which shows read density data when an image in which characters and photographs coexist is read.

For example, when an image in which characters and photographs coexist is read, the read image data are represented by a graph shown in FIG. 14. The left half of FIG. 14 shows a character region where the density changes rapidly, and the right half shows a photographic region in which density changes continuously and comparatively mildly.

Figure 15:
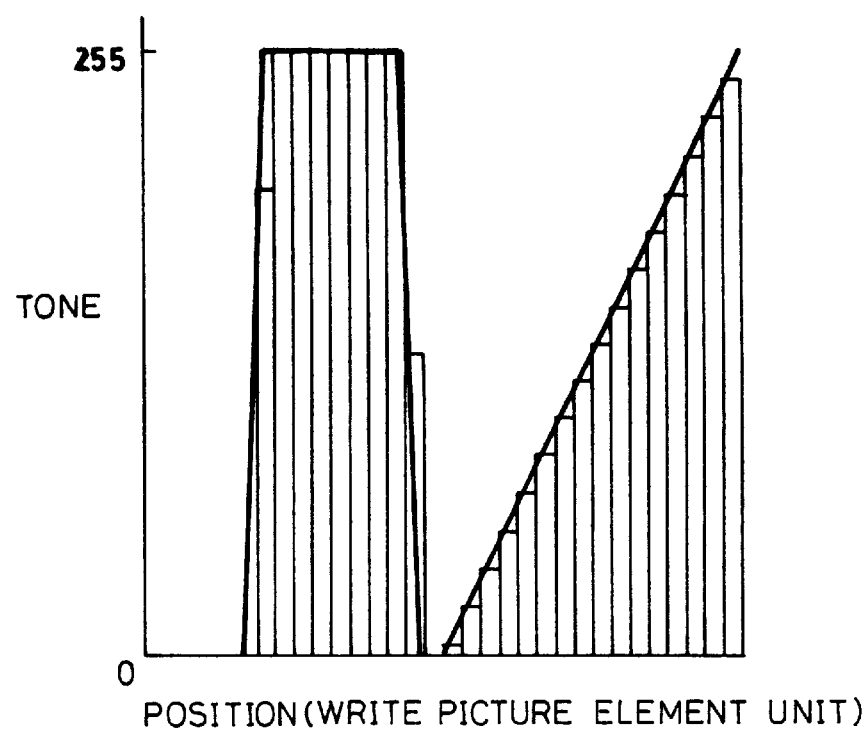
FIG. 15 is a graph which shows an output in the case of using the nearest neighbor interpolation when the read picture elements shown in FIG. 14 are reduced to half.

When the nearest neighbor interpolation, in which density of a picture element existing in the nearest neighborhood of a target picture element of a reduced image is used as the density of the target picture element, is used for the whole image at the time of reducing the read image data to half, an output image shown in FIG. 15 is obtained. Namely, in the left half of the output image, i.e., the character region, an edge is enhanced comparatively, and thus the image becomes clear, but in the right half, i.e., the photographic region, tone production is deteriorated, and thus a pseudo-contour is liable to be caused.

Figure 16:
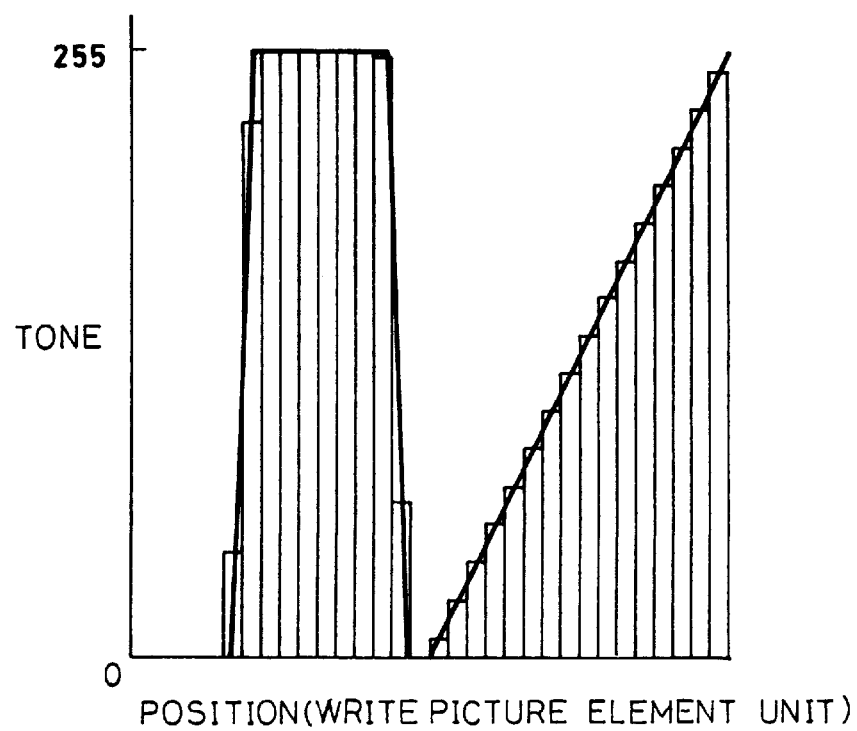
FIG. 16 is a graph which shows an output in the case of using the interpolation of first degree when the read picture elements shown in FIG. 14 are reduced to half.

In addition, when the read image data shown in FIG. 14 are reduced to half by the interpolation of first degree which uses a weighted linearly arithmetic mean of the density of a picture element which exists in the nearest neighborhood of a target picture element of an output image and the density of a picture element which is the second closest to the target picture element as the density of the target picture element, an output image shown in FIG. 16 is obtained. Namely, in the right half of the output image, i.e., the photographic region, the tone production becomes satisfactory, and thus the pseudo-contour is hardly caused, but in the left half, i.e., the character region, an edge becomes unclear.

Figure 17:
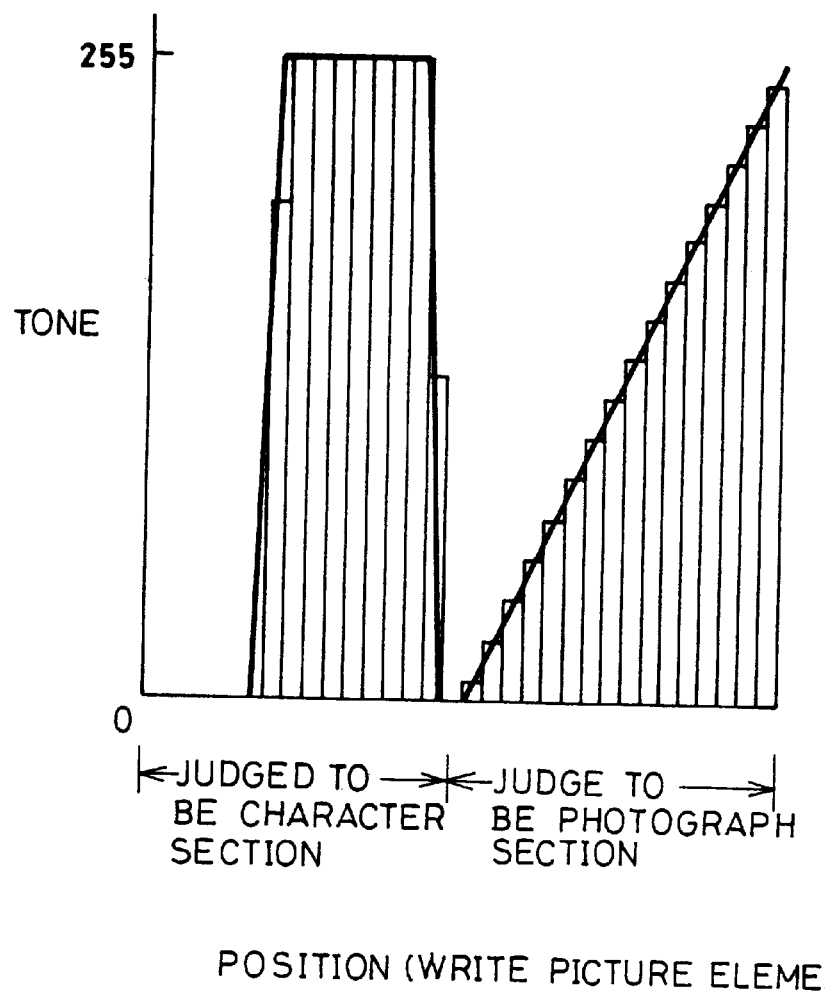
FIG. 17 is a graph which shows an output in the case of using the nearest neighbor interpolation in a section judged to be characters and using the interpolation of first degree in a section judged to be a photograph when the read picture elements shown in FIG. 14 are reduced to ½.

Therefore, in the present embodiment, when the region segmentation data are judged to be the character section, the nearest neighbor interpolation is used, and when the region segmentation data are judged to be the photographic section, the interpolation of first degree is used. A graphic of output image data obtained by the above method is shown in FIG. 17. In the left half of the FIG. 17, i.e., the region judged to be the character section, the edge is enhanced, and thus a clear image is obtained, and in the right half, i.e., the region judged to be the photographic section, the tone production becomes satisfactory, and thus a pseudo-contour is hardly caused.

In such a manner, the region segmentation data is referred to at the time of the reducing, and the variable magnification processing method which is closer to the nearest neighbor interpolation is used in a section with the strong possibility of characters, and the variable magnification method which is closer to the interpolation of first degree is used in a section with the strong possibility of photographs. As a result, the density of the reduced data can be determined more suitable.

Embodiment 2

The following describes another embodiment of the present invention on reference to FIGS. 5, 10, 18 and 19. Here, for convenience of explanation, those members that have the same arrangement and functions, and that are described in the aforementioned embodiment 1 are indicated by the same reference numerals and the description thereof is omitted.

In the image processing method of the aforementioned embodiment, if the possibility of characters is strong, the magnification is varied by the nearest neighbor interpolation. However, if the nearest neighbor interpolation is used for an edge of characters, the edge is not enhanced sufficiently.

Therefore, in the image processing method of the present embodiment, the nearest neighbor interpolation is not just used for an edge of characters, a method of multiplying density data obtained by the nearest neighbor interpolation by enlargement scale of the various scaling (i.e., "to enlarge by magnification") is adopted.

Figure 18:
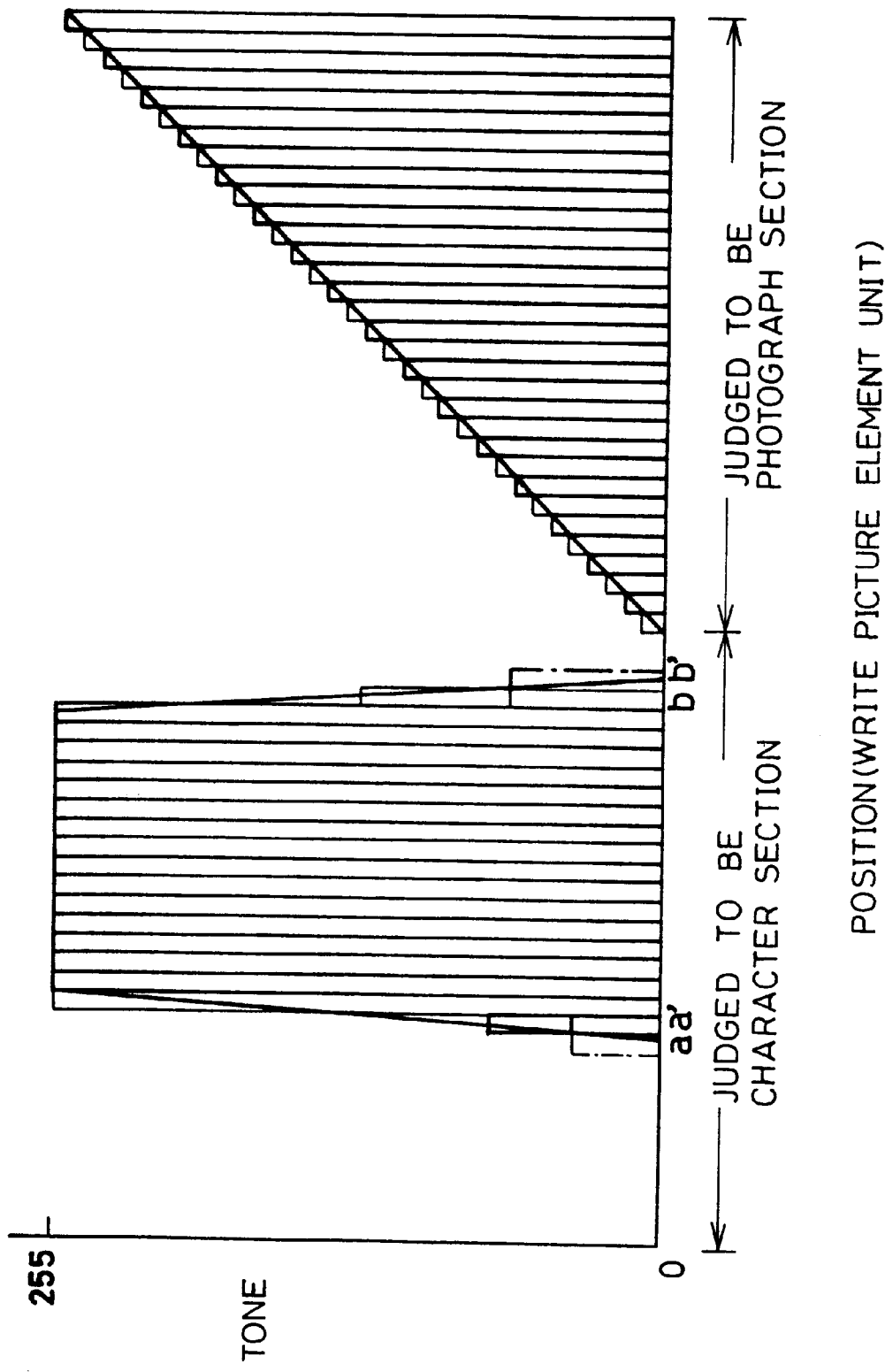
FIG. 18 is a graph which shows an output in the case of giving an edging process to a section judged to be characters in FIG. 13.

An output image which was subject to the variable scaling process is shown in FIG. 18.

In other words, in order to enlarge a read picture element shown in FIG. 10 twice, when the region segmentation data is referred to and are judged to be character section, the nearest neighbor interpolation is used. Moreover, the variable scaling process is performed on a section, which was judged to be a photographic section, by the interpolation of first degree. Therefore, the output image shown in FIG. 13 is obtained.

However, in the present embodiment, when the density of a picture element judged to be character section takes a value representing half tone, namely, in the case of an edge of characters, the nearest neighbor interpolation is not just used, but the magnification of the density data obtained by the nearest neighbor interpolation is enlarged by magnification and the pulse width is corrected.

A judgment can be made as to whether or not the density of the picture element takes a value representing half tone by whether or not the density of the picture element has a value which falls within a range of 0 to 255.

More specifically, as shown in FIG. 18, pulse widths (density of picture element) are corrected on sections of edges a and a' and edges b and b' of characters. First, a density, which was obtained by multiplying the density of the picture element obtained by the nearest neighbor interpolation by the magnification, is given to one picture element on each side of the density slope where the density is high in two picture elements of the edges, namely, the picture element on the edge a' side and the picture element on the edge b side.

Meanwhile, the density 0 is given to one picture element on each side of the density slope where the density is low in two picture elements of the edges, namely, the picture element on the edge a side and the picture element on the edge b' side.

According to this correction of the pulse width (density of a picture element), the density of the picture elements on the inside in the two picture elements of the edges of characters is multiplied by the magnification, and the density of the picture elements on the outside is changed to 0. As a result, the edge of characters is enhanced more than the use of the nearest neighbor interpolation, and thus a clear image can be obtained.

The nearest neighbor interpolation is used in principle for the section, which was judged to be the character section by the region segmentation section 3, namely, the left section of the drawing (the section marked with "judged to be character section"), and the pulse widths on the edges of characters are corrected. As a result, the edges are enhanced more than the case of FIG. 13, and thus a clear image can be obtained.

In addition, in the section, which was judged to be a photographic section by the region segmentation section 3, namely, the right half of the drawing (the section marked with "judged to be photographic section"), the tone production becomes satisfactory by adopting the interpolation of first degree, and a pseudo-contour is hardly caused.

The pulse width modulator 16 outputs images for each picture element based upon the special data 4c including the picture element density slope data, and the scaling-processed γ corrected image data 5a. As mentioned in embodiment 1, when the special data 4c of 2 bits per picture element take 00B representing being centered, the pulse width modulator 16 generates continuous ON signals so as to be centered on the picture element.

More specifically, as shown in FIG. 5(c), the input image data is 80H, i.e., has density of 128/256 and the input picture element density slope data are 00B representing being centered, one-fourth (64/256) picture element from the front is turned off, and the next half of picture element is turned on, and the rest one-fourth of the picture element is turned off. In such a manner, the pulse width modulator 16 changes an ON data position of one picture element by adjusting an output of a laser.

Therefore, the image data which were subject to the character edge process are represented by FIG. 19 (a), for example. The small rectangles 8 represent respectively one output picture element, and numerical values of the rectangles 8 represent density of each picture element (256 tone).

When the input picture element density slope data are 00B representing being centered, an image which is outputted based upon this image data is represented by FIG. 19(b). Namely, when the input picture element density slope data are the 00B representing being centered, a gap of an OFF signal is generated on an edge section. This is called as a ghost contour.

Therefore, in the present embodiment, when the position of the ON signal in one picture element is centered, in FIG. 19(b), the output control section 6 changes the position of the ON signal in one picture element by modulating the pulse width of this picture element so as to prevent a ghost contour.

In other words, picture elements on second through fourth rectangles on the leftmost file from the top 80H (i.e., 128) as shown in FIG. 19(a), and the second file from the left is FFH (i.e., 255). As a result, the density slope on the picture elements is such that the density on the left side is low and the density on the right side is high.

In addition, in FIG. 19(b), picture elements on the second through fourth rectangles on the rightmost file from the top are 80H as shown in FIG. 19(a), the second file from the right is FFH. As a result, density slope on these picture element is such that the density on the left side is high and the density on the right side is low.

Therefore, according to this information, when the density slope of target picture elements is such that the density on the left side is low and the density on the right side is high, a picture element output is changed to data (10B) representing being shifted to the right, and when the density slope of target picture elements is such that the density on the left side is high and the density on the right side is low, a picture element output is changed to data (01B) representing being shifted to the left.

In this manner, the output control section 6 changes the position of the ON signal in one picture elements by modulating the pulse width. As a result, as shown in FIG. 19(c), a gap of the OFF signal is not produced on an edge section of characters, thereby making it possible to prevent the ghost contour.

In accordance with the image processing method of the present embodiment, picture element density slope data S of adjacent picture elements are given to each picture element of an image. Meanwhile, in the case where the region segmentation data $X_p$ of the picture element P is 0 ($X_p=0$), the density $D_a$ of the picture element A which is the closest to the picture element P is half tone density and the picture element density slope data $S_p$ of the picture element P are positive, namely, data which represent that $D_a<D_p<D_b$, the density $D_p$ of the picture element P is converted into the value obtained by multiplying the half tone density and magnification together, and the density $D_a$ of the picture element A is set to 0. Moreover, when the density $D_a$ of the picture element A are half tone density and the picture element density slope data $S_p$ of the picture element P are negative, namely, data which represent that $D_a>D_p>D_b$, the density $D_a$ of the picture element A is converted into a value obtained by multiplying the half tone density and magnification together, and the density $D_p$ of the picture element P is set to 0.

In other words, when the read image is character data and the picture elements on a reading position is an edge of the characters, the picture elements mostly have half tone density. Thereafter, when the variable scaling process is performed according to the equation (1), the picture elements having the half tone density continue, and thus the edge becomes unclear.

However, in accordance with the above method, when the density $D_a$ of the picture element A which is the closest to the picture element P is half tone density and the picture element density slope data $S_p$ of the picture element P is positive, namely, $D_a<D_p<D_b$, the density $D_p$ of the picture element P is converted into a value obtained by multiplying the half tone density and magnification together, and the density $D_a$ of the picture element A is set to 0. Meanwhile, when the density $D_a$ of the picture element A is half tone density and the picture element density slope data of the picture element P is negative, namely, $D_a>D_p>D_b$, the density $D_a$ of the picture element A is converted into a value obtained by multiplying the half tone density and magnification together, and the density $D_p$ of the picture element P is set to 0.

Therefore, when a pulse width of picture elements for outputting a laser is modulated according to magnification, the density of edges of characters is further enhanced, and a clearer image can be obtained compared with the case where the nearest neighbor interpolation is just used.

In addition, in the image processing method of the present embodiment, a laser is outputted to a portion of picture elements where the density is high based upon the picture element density slope data on the picture elements to which a value obtained by multiplying the half tone density and magnification together was given.

Namely, in the case where the read image is character data and the picture element on the reading position is the edge of the image, when, for example, 8 bits/picture element is processed and the picture element has the half tone density, the density of the picture element is 128, i.e., 80H. Therefore, an image output apparatus which modulates the pulse width on one picture element so as to output a half-tone image, image data of 80H generates a half dot of one picture element in a center position of the picture elements. Then, in the case where the picture element where the half dot is generated in its center position is enlarged, a white picture element of a half dot appears between the above picture element and the adjacent picture element, and the appearance of this white picture element is repeated for one picture element. Therefore, there arises a problem that a ghost contour occurs.

However, in accordance with the above method, a laser is outputted to a portion of picture elements where the density is high, based upon the picture element density slope data on the picture elements to which a value obtained by multiplying the half tone density and magnification together was given.

Therefore, when the edge of the character data is subject to the variable scaling process through the image processing method in claim 5, a ghost contour is prevented from being caused on the left or right of one picture element on the edge of the character data.

Embodiment 3

The following describes still another embodiment of the present invention in reference to FIGS. 12 and 24. Here, for convenience of explanation, those members that have the same arrangement and functions, and that are described in the aforementioned embodiments 1 and 2 are indicated by the same reference numerals and the description thereof is omitted.

Figure 20:
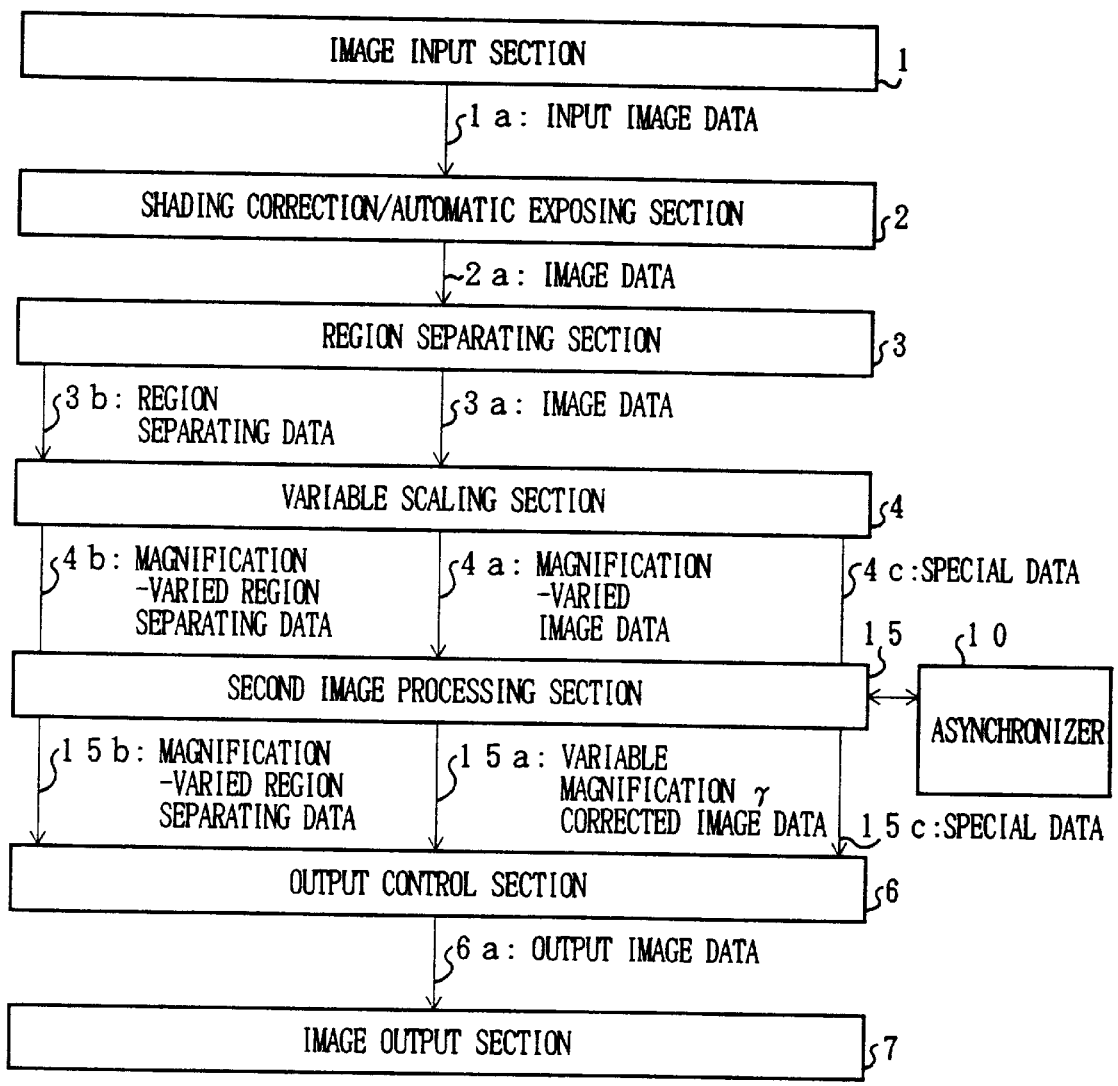
FIG. 20 is a block diagram which shows an arrangement of the digital copying machine which adopts an image processing method according to another embodiment of the present invention.

As shown in FIG. 20, the digital copying machine of the present embodiment is arranged so that besides the arrangement shown in FIG. 1, a second image processing section 15 is provided between the variable scaling section 4 and the output control section 6. A scaling-processed image can be transmitted from the second image processing section 15 to an asynchronizer 10 such as a facsimile and a personal computer.

In other words, as described in embodiment 1, in the digital copying machine, the image input section 1 reads a document image from a scanner, not shown, and converts the read image into the digital input image data 1a. Next, the shading correcting/automatic exposing section 2 performs the shading correction and the automatic exposure for the input image data 1a.

In addition, the region segmentation section 3 refers to density, etc. of picture elements in the vicinity of a target picture element of image data 2a which were subject to the shading correction and the automatic exposure so as to detect possibilities of characters, photographs and mesh dots of the target picture element. Then, the region segmentation section 3 outputs image data 3a and region segmentation data 3b.

The variable scaling section 4 performs scaling process on the inputted image data 3a and the region segmentation data 3b, and refers to picture elements in the vicinity of the target picture element so as to determine density slope of the target picture element. Then, the variable scaling section 4 outputs scaling-processed image data 4a, scaling-processed region segmentation data 4b and special data 4c.

At the time of the above variable scaling process, the equation (1) is used for the image data 3a, and the nearest neighbor interpolation is used for the region segmentation data 3b. Moreover, the special data 4c are composed of directing data, which show the front and rear of the line of the region segmentation data 3b and the end of the image data, and picture element density slope data S with respect to a picture element which is currently subject to the process. Further, when the region segmentation data 3b are other than data which represent strong possibility of characters, the picture element density slope data S are outputted as "no slope".

These outputs are outputted to the second image processing section 15. Then, they are transmitted to the asynchronizer 10 such as a facsimile and a personal computer, which is additionally provided, by a method, mentioned later.

On the contrary, an image which is scaled by another digital copying machine is received by and inputted to the second image processing section 15 via the asynchronizer 10 such as facsimile.

The scaling-processed image data 4a inputted into the second image processing section 15, the scaling-processed region segmentation data 4b and the special data 4c or the received and inputted variable magnification processed image are outputted as scaling-processed γ corrected image data 15a, scaling-processed region segmentation data 15b and special data 15c. Then, image output is controlled by the output control section 6, and a laser is outputted based upon a signal of inputted output image data 6a by the image output section 7.

The following described input and output of data from the variable scaling section 4 to the second image processing section 15.

Figure 21:
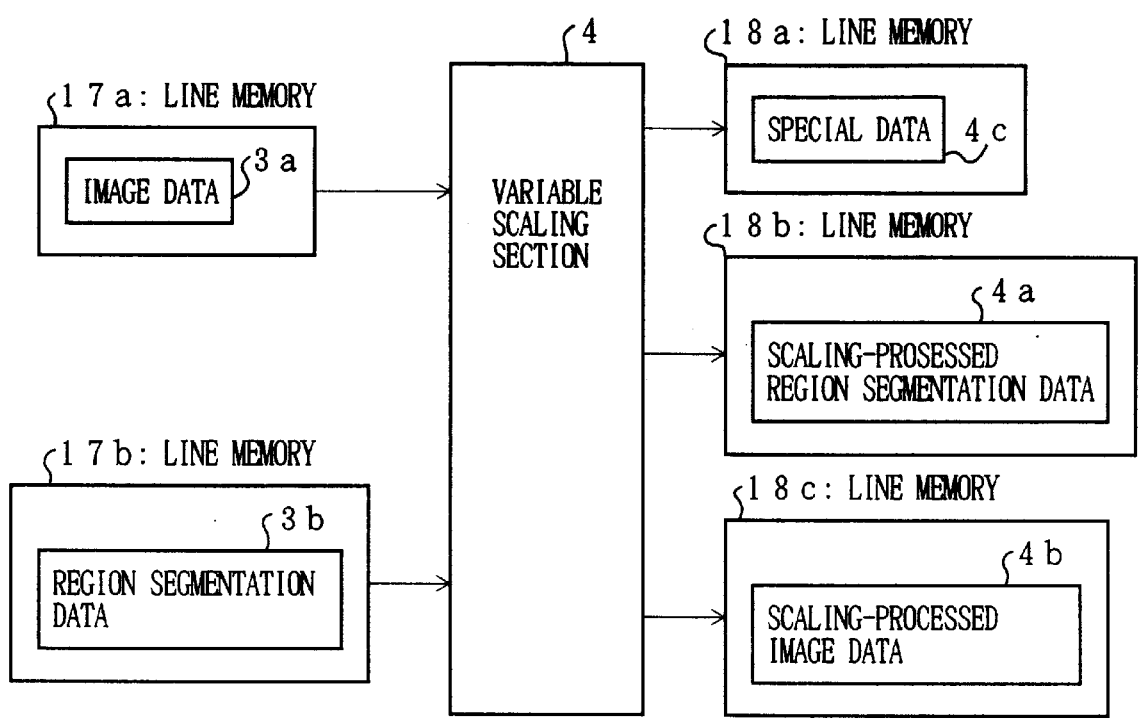
FIG. 21 is a block diagram which shows an arrangement of a variable scaling section in the digital copying machine.

As shown in FIG. 21, the image data 3a stored in a line memory 17a and the region segmentation data 3b stored in a line memory 17b are inputted into the variable magnification processing section 4.

In addition, the output data from the variable magnification processing section 4 are the special data 4c stored in a line memory 18a, the magnification varied image data 4a stored in a line memory 18b and the magnification varied region segmentation data 4b stored in a line memory 18c.

When the scaling-processed image data 4a and the scaling-processed region segmentation data 4b are outputted, directing data, which represent starting of data, the rear of each line and end of the image data, are added to the special data 4c. The information which represents the starting of data, the rear of each line and the end of the image data, is given at the same time when the input image data are inputted from the image input section 1.

Figure 22A:
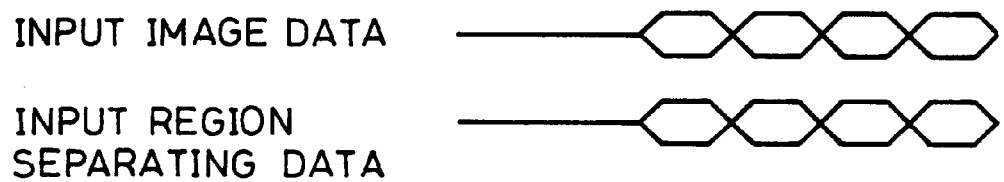
FIG. 22(a) is a drawing which shows the front of each line of each data inputted to the variable magnification processing section.
Figure 22B:
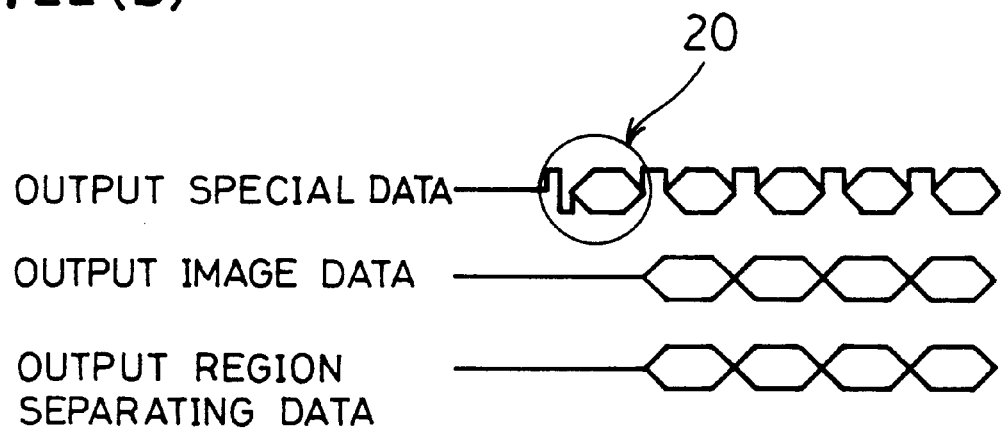
FIGS. 22 (a) and 22 (b) are explanatory drawings which show states that when scaling-processed image data and scaling-processed region segmentation data are outputted simultaneously, their respective directing data are outputted simultaneously.
Figure 23A:
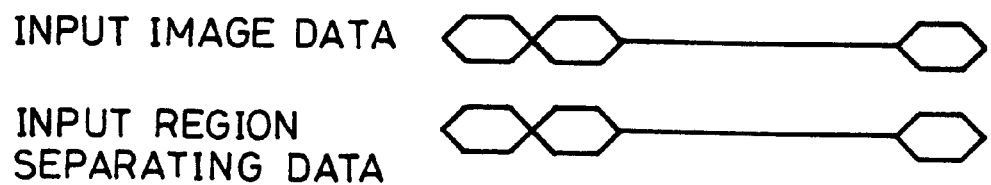
FIGS. 23(a) and 23(b) are explanatory drawings which show states that when scaling-processed image data and scaling-processed region segmentation data are outputted simultaneously, their respective directing data are outputted simultaneously.
Figure 23B:
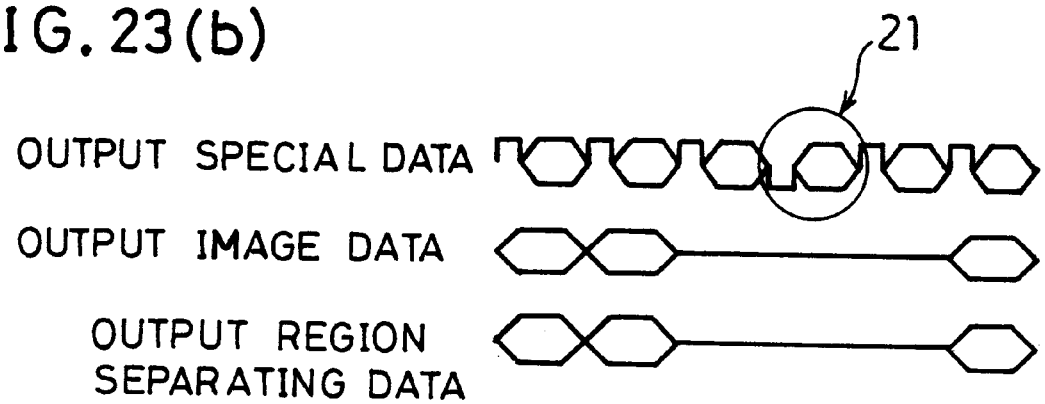
Figure 24A:
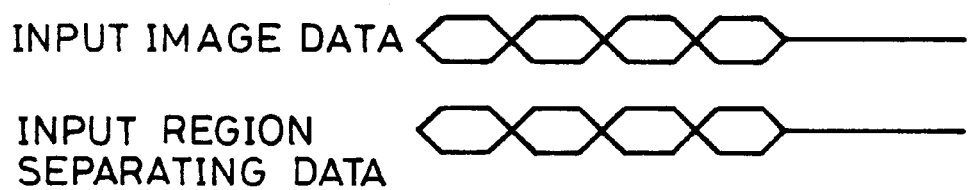
FIGS. 24(a) and 24(b) are explanatory drawings which show states that when scaling-processed data and scaling-processed region segmentation data are outputted simultaneously, their respective directing data are outputted simultaneously.
Figure 24B:
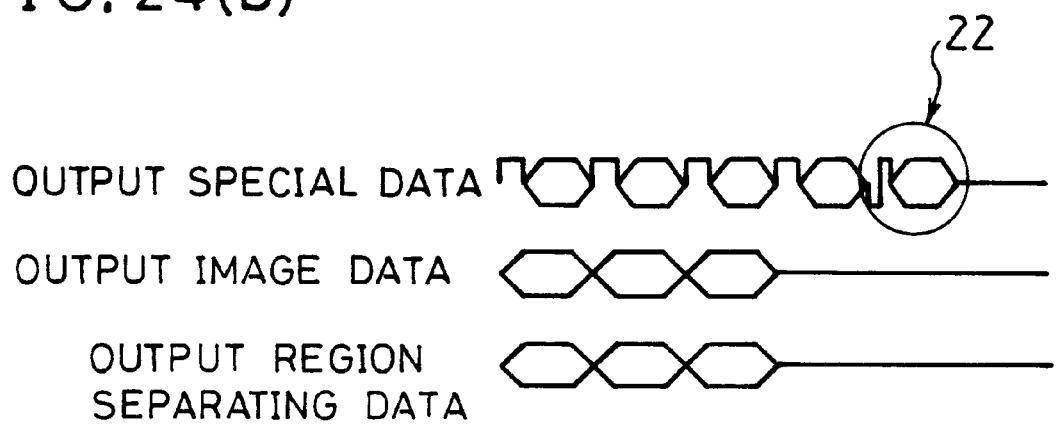

More specifically, in order to represent the starting of the scaling-processed image data 4a and the scaling-processed region segmentation data 4b as shown in FIGS. 22(a) and 22(b), start directing data 20 are outputted as the directing data, which represent the starting of data, on output special data as indicated by a circle in FIG. 22(b). Moreover, in order to represent the rears of the lines of the scaling-processed image data 4a and the scaling-processed region segmentation data 4b as shown in FIGS. 23(a) and 23(b), rear directing data 21 ate outputted as directing data, which represent the rears of the lines, on the output special data as indicated by a circle in FIG. 23(b). Further, in order to represent the end of the whole image data of the magnification varied image data 4a and the scaling-processed region segmentation data 4b as shown in FIGS. 24(a) and 24(b), image data end directing data 22 are outputted as directing data, which represent the end of the whole image data, on the output special data as indicated by a circle in FIG. 24(b).

In such a manner, directing data 20, 21 and 22, which respectively represent the front and rear of a line and the end of image data are given to the special data 4c, and the scaling-processed image data 4a and the scaling-processed region segmentation data 4b are combined so as to be outputted. As a result, a line counter or the like is not required even in the second image processing section 15, and output data can be generated by a simple arrangement of hardware so as to be transmitted to the asynchronizer 10.

As mentioned above, the image processing method of the present embodiment reads an image, divides the read image into blocks composed of a plurality of picture elements and interpolate each picture element so as to variably scale the image. In accordance with this image processing method, possibilities of characters, photographs and mesh dots of each picture element of the image are detected by the region segmentation section 3, and the scaling-processed image data 4a as interpolated picture element data of each picture element are computed by the variable scaling section 4 based upon the detected result so as to scale the image. Meanwhile, at the time of the computation of the scaling-processed image data 4a per picture element, the region segmentation data 3b detected by the region segmentation section 3 are subject to the variable scaling process based upon the result detected by the region segmentation section 3 so as to be outputted as the scaling-processed region segmentation data 4b together with the scaling-processed image data 4a.

In the case where the scaling-processed image data 4a is desired to be outputted to the asynchronizer 10 such as a facsimile and a personal computer, for example, even if the region segmentation data 3b are not subject to the variable scaling process, a number of picture elements does not agree with the scaling-processed image data 4a. Therefore, there arises a problem that the region segmentation data 3b cannot be used.

However, in the above method, also the region segmentation data 3b detected by the region segmentation section 3 are subject to the variable scaling process based upon the result detected by the region segmentation section 3 so as to be outputted as the scaling-processed region segmentation data 4b together with the scaling-processed image data 4a.

Therefore, since a number of picture elements of magnification varied image data agrees with that of region segmentation data, even if these data are outputted to an external asynchronous image input/output device such as a facsimile and a personal computer, region segmentation data can be used.

In addition, since the possibilities of characters, photographs and mesh dots are given also to the scaling-processed region segmentation data 4b, they are combined together so that the scaling-processed image can be outputted to the asynchronizer 10.

In addition, in the case where the scaling-processed image data 4a and the scaling-processed region segmentation data 4b are simultaneously outputted, the image processing method of the present embodiment simultaneously outputs the direction data 20, 21 and 22, which represent the front and rear of each line of plural picture elements on output data, and the end of image data.

In other words, in the case where the scaling-processed image data 4a are outputted to the asynchronizer 10 such as a facsimile and a personal computer, when the directing data, which represent the front and rear of the lines and the end of the image data, do not exist in the scaling-processed region segmentation data 4b, a number of picture elements for one line and a total number of lines should be transmitted to an external asynchronizer 10. Furthermore, even if the above numbers are transmitted to the synchronizer 10, a line counter should be always provided.

However, in accordance with the above method, since the directing data 20, 21 and 22, which represent the front and rear of each line of plural picture elements on the output data and the end of the image data, are simultaneously outputted, a number of picture elements of one line and a total number of lines do not have to be transmitted to an external asynchronizer 10, thereby making it possible to avoid installation of the line counter.

In the present embodiment, the nearest neighbor interpolation is used for the variable scaling process of the region segmentation data 3b, but the method is not limited to this, and thus the scaling process can be performed based upon the region segmentation data 3b like scaling of image data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing method comprising the steps of:

dividing an image into blocks composed of a plurality of picture elements;

detecting region segmentation data, which represent possibilities of characters,
photographs and mesh dots in a block including a target picture element, by region segmentation means, wherein in said detecting step, the region segmentation data are set so as to take a value X which falls within the range of O to N−1 (N is an integral number not less than 2) and so that as the possibility of characters is stronger, the region segmentation data takes a smaller value and as the possibilities of photographs and mesh dots are stronger, the region segmentation data takes a larger value;

scaling the image; and computing density of the target picture element on the scaled image by computing means according to an equation into which densities of a plurality of adjacent picture elements in the vicinity of the target picture element are inputted, wherein in said computing step, a weight of the density of each adjacent picture element in the equation is varied continuously according to the region segmentation data of the target picture element, and density Dp of a picture element P which is a target picture element whose density should be determined, is computed according to the following equation:

$$Dp=(1-K) \times Da + K \times Db \qquad (1)$$

(However, $K=(Xp/(N-1)) \times (PA/(PA+PB))$)

where Xp is region segmentation data of the picture element P, Da is density of a picture element A which is the closest to the picture element P, Db is density of a picture element B which is the second closest to the picture element P, PA is a distance between the picture element P and the picture element A, and PB is a distance between the picture element P and the picture element B.

2. The image processing method according to claim 1, wherein in said computing step, the weight of the density of each adjacent picture element in the equation is varied continuously so as to fall within a range of a weight obtained by a nearest neighbor interpolation to weights obtained by the interpolations of first through third degrees.

3. The image processing method according to claim 1, wherein in said computing step, as the possibility of characters represented by the region segmentation data is stronger, a weight of density of an adjacent picture elements which is the closest to the target picture element in the equation is set larger, and as the possibilities of photographs and mesh dots represented in the region segmentation data are stronger, the weight is set smaller.

4. The image processing method according to claim 1, further comprising the steps of:

obtaining picture element density slope data which represent density slope of the picture element P with respect to picture elements which are adjacent to the picture element P after said computing step; and on the picture element P whose region segmentation data Xp is O and whose density Dp is half-tone density, and on the picture element A which is the closest to the picture element P, when the picture element density slope data are data representing a relationship Da<Dp<Db, converting the density Dp into a value obtained by multiplying the half-tone density and magnification of the various scaling together and setting the density Da to 0, whereas when the picture element density slope data are data representing a relationship Db<Dp<Da, converting the density Da into a value obtained by multiplying the half-tone density and magnification together and setting the density Dp to 0.

5. The image processing method according to claim 4, further comprising:

the step of outputting a laser beam according to density data with respect to the picture element P after said converting step;

wherein in said laser outputting step, the laser beam corresponding to the picture element P, to which the value obtained by multiplying the half-tone density and the magnification together is given, is outputted in a position which is shifted to one of the adjacent picture elements whose density is higher based upon the picture element density slope data of the picture element P.

6. The image processing method according to claim 1, wherein in said computing step, when the data of each target picture element is computed by said computing means, the region segmentation data detected by said region segmentation means is scaled so as to be outputted together with the scaled image data.

7. The image processing method according to claim 6, wherein the variable magnification process for the region-segmentation data in said computing step is performed by using the nearest neighbor interpolation.

8. The image processing method according to claim 6, wherein the variable magnification process for the region segmentation data in said computing step is performed based upon the result detected by said region segmentation means.

9. The image processing method according to claim 6, further comprising:

the step of simultaneously outputting the scaled image and the scaled region segmentation data after the computing step, wherein in said outputting step, directing data, which represent a front and a rear of each line of plural picture elements on the output data and end of the image, together with the scaled image data and the scaled region segmentation data.

10. The image processing method according to claim 1, further comprising:

the step of obtaining picture element density slope data which represent density slope of the target picture element with respect to picture elements which are adjacent to the target picture element after said computing step; and the step of outputting a laser beam according to the density data of each picture element;

wherein in said laser outputting step, the laser beam corresponding to the target picture element, which has half-tone density, is outputted in a position which is shifted to one of the adjacent picture elements whose density is higher based upon the picture element density slope data of the target picture element.

11. The image processing method according to claim 1, further comprising the step of reading a document image and converting the read image into image data so as to input the image data into said region segmentation means before said detecting step.

12. The image processing method according to claim 1, wherein:

said image processing method is a method of enlarging an image composed of a plurality of picture elements by inserting interpolated picture elements respectively between the picture elements, the target picture element of which the density computed in said computing step is the interpolated picture element.

13. The image processing method according to claim 12, further comprising the step of reading a document image and converting the read image into image data so as to input the image data into said region segmentation means before said detecting step.

14. An image processing apparatus for scaling inputted image so as to output the magnification varied image, comprising:

region segmentation means for dividing the input image into blocks composed of a plurality of picture elements and detecting region segmentation data, which represent possibilities of characters, photographs and mesh dots of a block of a target picture element per target picture element, wherein said region segmentation means sets the region segmentation data so as to take a value X which falls within the range of O to N−1 (N is an integral number not less than 2) and so that as the possibility of characters is stronger, the region segmentation data takes a smaller value and as the possibilities of photographs and mesh dots are stronger, the region segmentation data takes a larger value; and computing means for computing density of the target picture element on the output image by using an equation in which density of a plurality of adjacent picture elements in the vicinity of the target picture element is inputted, wherein said computing means adjusts a weight of the density of each adjacent picture element in the equation according to the region segmentation data of the target picture element, and computes density Dp of a picture element P, which is a target picture element whose density should be determined, according to the following equation:

$$Dp = (1-K) \times Da + K \times Db \quad (1)$$

(However, $K = (Xp/(N-1)) \times (PA/(PA+PB))$)

where Xp is region segmentation data of the picture element P, Da is density of a picture element A which is the closest to the picture element P, Db is density of a picture element B which is the second closest to the picture element P, PA is a distance between the picture element P and the picture element A, and PB is a distance between the picture element P and the picture element B.

* * * * *